US012258870B1

(12) United States Patent
Molnar, Jr. et al.

(10) Patent No.: US 12,258,870 B1
(45) **Date of Patent: *Mar. 25, 2025**

(54) ADJUSTABLE FAN TRACK LINER WITH SLOTTED ARRAY ACTIVE FAN TIP TREATMENT FOR DISTORTION TOLERANCE

(71) Applicants: Rolls-Royce North American Technologies Inc., Indianapolis, IN (US); Rolls-Royce Corporation, Indianapolis, IN (US)

(72) Inventors: Daniel E. Molnar, Jr., Indianapolis, IN (US); Robert W. Heeter, Indianapolis, IN (US); Jonathan M. Rivers, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,620

(22) Filed: Mar. 8, 2024

(51) Int. Cl.

| | |
|---|---|
| ***F04D 29/68*** | (2006.01) |
| ***F01D 11/08*** | (2006.01) |
| ***F01D 17/12*** | (2006.01) |
| ***F04D 29/52*** | (2006.01) |
| *F01D 11/22* | (2006.01) |

(52) U.S. Cl.

CPC .............. *F01D 17/12* (2013.01); *F01D 11/08* (2013.01); *F04D 29/526* (2013.01); *F04D 29/685* (2013.01); *F01D 11/22* (2013.01); *F05D 2220/32* (2013.01); *F05D 2240/12* (2013.01); *F05D 2260/60* (2013.01)

(58) Field of Classification Search

CPC ...... F04D 29/685; F04D 29/526; F01D 11/08; F01D 11/22

See application file for complete search history.

(56) References Cited

U.S. PATENT DOCUMENTS

| | | | |
|---|---|---|---|
| 4,086,022 | A | 4/1978 | Freeman et al. |
| 4,155,680 | A | 5/1979 | Linko, III et al. |
| 4,239,452 | A | 12/1980 | Frank, Jr. |
| 5,137,419 | A | 8/1992 | Waterman |
| 5,308,225 | A | 5/1994 | Koff et al. |
| 5,474,417 | A | 12/1995 | Privett et al. |
| 5,762,470 | A | 6/1998 | Gelmedov et al. |
| 6,231,301 | B1 | 5/2001 | Barnett et al. |
| 6,406,470 | B1 | 6/2002 | Kierce |
| 6,497,551 | B1 | 12/2002 | Hand et al. |

(Continued)

FOREIGN PATENT DOCUMENTS

| | | | |
|---|---|---|---|
| CN | 201152282 | Y | 11/2008 |
| CN | 104373388 | B | 1/2017 |

(Continued)

*Primary Examiner* — Woody A Lee, Jr.
*Assistant Examiner* — Behnoush Haghighian
(74) *Attorney, Agent, or Firm* — Barnes & Thornburg LLP

(57) ABSTRACT

A gas turbine engine includes a fan and a fan case assembly. The fan includes a fan rotor configured to rotate about an axis of the gas turbine engine and a plurality of fan blades coupled to the fan rotor for rotation therewith. The fan case assembly extends circumferentially around the plurality of fan blades radially outward of the plurality of the fan blades.

20 Claims, 10 Drawing Sheets

(56) References Cited

U.S. PATENT DOCUMENTS

| | | | | |
|---|---|---|---|---|
| 6,514,039 | B1 | 2/2003 | Hand | |
| 6,619,909 | B2 | 9/2003 | Barnett et al. | |
| 6,648,591 | B2 | 11/2003 | Collins | |
| 6,685,426 | B2 | 2/2004 | Clark | |
| 6,736,594 | B2 * | 5/2004 | Irie | F04D 29/547 415/173.1 |
| 6,742,983 | B2 | 6/2004 | Schmuecker | |
| 6,832,890 | B2 | 12/2004 | Booth | |
| 6,905,305 | B2 | 6/2005 | James | |
| 6,935,833 | B2 | 8/2005 | Seitz | |
| 7,077,623 | B2 | 7/2006 | Guemmer | |
| 7,186,072 | B2 | 3/2007 | Seitz | |
| 7,210,905 | B2 | 5/2007 | Lapworth | |
| 7,575,412 | B2 | 8/2009 | Seitz | |
| 7,967,556 | B2 | 6/2011 | Volker | |
| 8,043,046 | B2 | 10/2011 | Guemmer | |
| 8,152,444 | B2 | 4/2012 | Guemmer | |
| 8,152,445 | B2 | 4/2012 | Guemmer | |
| 8,152,467 | B2 | 4/2012 | Guemmer | |
| 8,182,209 | B2 | 5/2012 | Brault et al. | |
| 8,192,148 | B2 | 6/2012 | Guemmer | |
| 8,257,022 | B2 | 9/2012 | Guemmer | |
| 8,262,340 | B2 | 9/2012 | Guemmer | |
| 8,337,146 | B2 | 12/2012 | Yu | |
| 8,403,630 | B2 | 3/2013 | Guemmer | |
| 8,419,355 | B2 | 4/2013 | Guemmer et al. | |
| 8,602,720 | B2 | 12/2013 | Goswami et al. | |
| 8,845,269 | B2 | 9/2014 | Agneray et al. | |
| 8,915,699 | B2 | 12/2014 | Brignole et al. | |
| 9,638,213 | B2 | 5/2017 | Obrecht et al. | |
| 9,651,060 | B2 | 5/2017 | Morel et al. | |
| 9,816,528 | B2 | 11/2017 | Johann | |
| 9,957,976 | B2 | 5/2018 | Allford | |
| 10,024,336 | B2 | 7/2018 | Obrecht et al. | |
| 10,047,620 | B2 | 8/2018 | Giacché et al. | |
| 10,066,640 | B2 | 9/2018 | Bennington et al. | |
| 10,378,550 | B2 * | 8/2019 | Lim | F04D 29/685 |
| 10,450,869 | B2 | 10/2019 | Brignole et al. | |
| 10,539,154 | B2 | 1/2020 | Mallina et al. | |
| 10,914,318 | B2 | 2/2021 | Capozzi et al. | |
| 11,078,805 | B2 | 8/2021 | Joly et al. | |
| 11,092,030 | B2 * | 8/2021 | Joly | F04D 29/685 |
| 11,131,322 | B2 | 9/2021 | Grothe et al. | |
| 11,473,438 | B2 | 10/2022 | Reynolds et al. | |
| 11,572,897 | B1 * | 2/2023 | Duong | F04D 27/0246 |
| 11,686,207 | B2 | 6/2023 | Brignole et al. | |
| 11,702,945 | B2 | 7/2023 | Heeter et al. | |
| 11,732,612 | B2 | 8/2023 | Molnar, Jr. et al. | |
| 2003/0002982 | A1 * | 1/2003 | Irie | F04D 15/0027 415/220 |
| 2005/0226717 | A1 | 10/2005 | Xu | |
| 2007/0147989 | A1 | 6/2007 | Collins | |
| 2008/0044273 | A1 | 2/2008 | Khalid | |
| 2009/0065064 | A1 | 3/2009 | Morris et al. | |
| 2010/0310353 | A1 | 12/2010 | Yu | |
| 2012/0269619 | A1 | 10/2012 | Johann | |
| 2012/0315131 | A1 * | 12/2012 | Mertens | F04D 27/0215 415/126 |
| 2014/0119883 | A1 | 5/2014 | Kempf | |
| 2015/0086344 | A1 | 3/2015 | Guemmer | |
| 2016/0010652 | A1 * | 1/2016 | Lim | F04D 27/002 415/128 |
| 2016/0230776 | A1 | 8/2016 | Bennington et al. | |
| 2018/0163562 | A1 | 6/2018 | Khare et al. | |
| 2020/0224675 | A1 | 7/2020 | Capozzi et al. | |
| 2020/0332673 | A1 * | 10/2020 | Joly | F01D 9/047 |

FOREIGN PATENT DOCUMENTS

| | | | |
|---|---|---|---|
| CN | 110242616 | A | 9/2019 |
| CN | 113217469 | A | 8/2021 |
| DE | 60201109 | T2 | 10/2004 |
| DE | 102007056953 | A1 | 5/2009 |
| DE | 102011007767 | A1 | 10/2012 |
| DE | 102013210169 | A1 | 12/2014 |
| DE | 102018203304 | A1 | 9/2019 |
| EP | 2268926 | B1 | 8/2011 |
| EP | 2434164 | | 3/2012 |
| EP | 2434164 | A1 | 3/2012 |
| EP | 3081779 | | 10/2016 |
| EP | 3081779 | A1 | 10/2016 |
| EP | 3591237 | A1 | 1/2020 |
| EP | 3006679 | B1 | 9/2023 |
| FR | 3122450 | A1 | 11/2022 |
| GB | 2408546 | A | 6/2005 |
| GB | 2477745 | A | 8/2011 |
| JP | 2003227497 | A | 8/2003 |
| KR | 200930757 | A | 3/2009 |
| KR | 1025867 | B1 | 3/2011 |
| KR | 1387391 | B1 | 4/2014 |
| WO | 2014098276 | A1 | 6/2014 |
| WO | 2022229555 | A2 | 11/2022 |

* cited by examiner

ADJUSTABLE FAN TRACK LINER WITH SLOTTED ARRAY ACTIVE FAN TIP TREATMENT FOR DISTORTION TOLERANCE

STATEMENT REGARDING FEDERALLY SPONSORED RESEARCH OR DEVELOPMENT

Embodiments of the present disclosure were made with government support under Contract No. FA8650-19-D-2063 or FA8650-19-F-2078. The government may have certain rights.

FIELD OF THE DISCLOSURE

The present disclosure relates generally to gas turbine engines, and more specifically to fan assemblies for gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

In embedded gas turbine engine applications, the engine may experience high distortion in the form of pressure gradients and swirl. The pressure and swirl distortions may cause engine stall or other undesirable aeromechanical behavior. The fan of the gas turbine engine may include mitigation systems to reduce or minimize the negative effects of pressure and swirl distortions to improve stall margin of the engine.

SUMMARY

The present disclosure may comprise one or more of the following features and combinations thereof.

A fan case assembly may be adapted for use with a gas turbine engine. The fan case assembly may include a case, a plurality of drums, and a control unit.

In some embodiments, the case may extend circumferentially at least partway about a central axis of the fan case assembly to define an outer boundary of a gas path of the gas turbine engine. The case may be formed to define a plenum. The plenum may extend circumferentially at least partway about the central axis.

In some embodiments, the plurality of drums may be arranged in the plenum. The plurality of drums may be spaced circumferentially about the central axis. Each drum of the plurality of drums may be shaped to include a slot that extends through the corresponding drum. Each drum of the plurality of drums may be configured to rotate about a respective drum axis between a closed position and a fully open position.

In some embodiments in the closed position, the slot of the corresponding drum may extend circumferentially relative to the central axis to close off the slot from the gas path. In the closed position, the slot of the corresponding drum may extend circumferentially relative to the central axis to block fluid communication between the gas path and the plenum through the slot. In the fully open position, the slot of the corresponding drum may extend radially relative to the central axis to open the slot to the gas path. In the fully open position, the slot of the corresponding drum may extend radially relative to the central axis to allow fluid communication between the gas path and the plenum through the slot.

In some embodiments, the control unit may be configured to rotate the plurality of drums about the respective drum axis between the closed position and the fully open position. The control until may be configured to rotate the plurality of drums in response to preselected operating conditions to minimize negative effects pressure and swirl distortions in the gas turbine engine to improve stall margin.

In some embodiments, the plurality of drums may each be configured to rotate relative to the case to a plurality of partially opened positions. The plurality of partially opened position may be between the closed position and the fully open position. In the plurality of partially opened positions, each slot may be at an intermediate angle relative to the gas path between the closed position and the fully open position so as to vary the fluid communication between the gas path of the gas turbine engine and the plenum.

In some embodiments, the plurality of partially opened positions may include a first partially opened position and a second partially opened position. In the first partially opened position, the slot of the corresponding drum may angled in a first circumferential direction about the central axis. In the second partially opened position, the slot of the corresponding drum may be angled in a second circumferential direction about the central axis. The second circumferential direction may be opposite to the first circumferential direction.

In some embodiments, the plurality of drums may include a first set of drums and a second set of drums. The first set of drums may be configured to rotate from the closed position to the fully open position independent of the second set of drums.

In some embodiments, the first set of drums may be arranged in series. The second set of drums may be arranged in series spaced apart circumferentially from the first set of drums. In some embodiments, the first set of drums may be alternated circumferentially between the second set of drums.

In some embodiments, each drum of the plurality of drums may have a cylindrical shape. The cylindrical shape of each of the plurality of drums may define a first end, a second end spaced apart axially from the first end, and an outer surface that extends axially between the first end and the second end and circumferentially about the corresponding drum axis. The outer surface of each drum of the plurality of drums may cooperate with an inner surface of the gas path to define a portion of the outer boundary of the gas path when each drum of the plurality of drums is in the closed position to block fluid communication between the gas path and the plenum.

In some embodiments, the control unit may include an actuator and a controller. The actuator may be coupled to the plurality of drums. The actuator may be configured to drive rotation of the plurality of drums between the closed position and the fully open position. The controller may be coupled to the actuator. The controller may be configured to direct the actuator to move the plurality of drums to the closed position when the gas turbine engine is in a cruise condition included in the preselected operating conditions.

In some embodiments, the control unit may include a memory. The memory may be coupled to the controller. The memory may include a plurality of preprogrammed aircraft maneuvers that each correspond to one of the closed position and the fully open position. The controller may be configured to detect a preprogrammed aircraft maneuver included in the plurality of preprogrammed aircraft maneuvers on the memory. The controller may be configured to direct the actuator to move the plurality of drums to a corresponding position in response to detecting the preprogrammed aircraft maneuver.

In some embodiments, the control unit includes the sensor. The sensor may be coupled to the controller. The sensor may be configured to measure one of pressure, air speed, altitude, blade tip timing, blade rotational speed, attitude, and acceleration. The controller may be configured to receive a measurement from the at least one sensor. The controller may direct the actuator to move the plurality of drums to a corresponding position in response to the measurement of the sensor.

According to another aspect of the present disclosure, the gas turbine engine may include a fan and a fan case assembly. The fan may include a fan rotor and a plurality of fan blades. The fan may be configured to rotate about an axis of the gas turbine engine. The plurality of fan blades may be coupled to the fan rotor for rotation therewith.

In some embodiments, the fan case assembly may include a case, a plurality of drums, and a control unit. The case may extend circumferentially at least partway about a central axis of the fan case assembly. The case may define an outer boundary of a gas path of the gas turbine engine. The case may be formed to define a plenum. The plenum may extend circumferentially at least partway about the central axis.

In some embodiments, the plurality of drums may be arranged in the plenum. Each drum of the plurality of drums may be shaped to include a slot that extends through the corresponding drum. Each drum of the plurality of drums may be configured to rotate about a respective drum axis between a closed position and a fully opened position.

In some embodiments, in the closed position, the slot of the corresponding drum may extend circumferentially relative to the central axis to block fluid communication between the gas path and the plenum through the slot. In the fully open position, the slot of the corresponding drum may extend radially relative to the central axis to allow fluid communication between the gas path and the plenum through the slot.

In some embodiments, the control unit may be configured to rotate the plurality of drums about the respective drum axis between the closed position and the fully open position. The control unit may be configured to rotate the plurality of drums in response to preselected operating conditions to minimize negative effects of pressure and swirl distortions in the gas turbine engine to improve stall margin.

In some embodiments, the plurality of drums may each be configured to rotate relative to the case to a plurality of partially open positions. The plurality of partially open positions may be between the closed position and the fully open position. In the plurality of partially open positions, each drum of the plurality of drums may be at an intermediate angle relative to the gas path between the closed position and the fully open position so as to vary the fluid communication between the gas path of the gas turbine engine and the plenum.

In some embodiments, the plurality of partially opened positions may include a first partially opened position and a second partially open position. In the first partially opened position, the slot of the corresponding drum may be angled in a first circumferential direction about the central axis. In the second partially opened position, the slot of the corresponding drum may be angled in a second circumferential direction about the central axis. The second circumferential direction may be opposite to the first circumferential direction.

In some embodiments, each of the plurality of fan blades includes a leading edge and a trailing edge of the plurality of fan blades. In some embodiments, the plenum and the plurality of drums may be located closer to the leading edge. In some embodiments, the plenum and the plurality of drums may be located closer to the trailing edge of the plurality of fan blades.

In some embodiments, each drum of the plurality of drums may have a cylindrical shape. The cylindrical shape of each of the plurality of drums may define a first end, a second end spaced apart axially from the first end, and an outer surface that extends axially between the first end and the second end and circumferentially about the corresponding drum axis. The outer surface of each drum of the plurality of drums may cooperate with an inner surface of the gas path to define a portion of the outer boundary of the gas path when each drum of the plurality of drums is in the closed position to block fluid communication between the gas path and the plenum.

In some embodiments, the first set of drums may be arranged in series. The second set of drums may be arranged in series spaced apart circumferentially from the first set of drums. In some embodiments, the first set of drums may be alternated circumferentially between the second set of drums.

In some embodiments, the control unit may include an actuator and a controller. The actuator may be coupled to the plurality of drums. The actuator may be configured to drive movement of the plurality of drums between the closed position and the fully open position. The controller may be coupled to the actuator. The controller may be configured to direct the actuator to move the plurality of drums to the closed position when the gas turbine engine is in a cruise condition included in the preselected operating conditions.

In some embodiments, the control unit may include a memory. The memory may be coupled to the controller. The memory may include a plurality of preprogrammed aircraft maneuvers. The plurality of preprogramed aircraft maneuvers may each correspond to one of the closed position and the fully open position. The controller may be configured to detect a preprogrammed aircraft maneuver included in the plurality of preprogrammed aircraft maneuvers on the memory. The controller may be configured to direct the at least one actuator to move the plurality of drums to a corresponding position in response to detecting the preprogrammed aircraft maneuver.

According to another aspect of the present disclosure, a method may include providing a fan case assembly. The fan case assembly may be adapted for use with a gas turbine engine.

In some embodiments, the fan case assembly may include a case and a plurality of drums. The case may extend circumferentially at least partway about a central axis of the gas turbine engine. The case may be formed to define an outer boundary of a gas path of the gas turbine engine. The case may be formed to define a plenum that extends circumferentially at least partway about the central axis.

In some embodiments, the plurality of drums may be arranged in the plenum. Each drum of the plurality of drums may be shaped to include a slot that extends through the corresponding drum. Each drum of the plurality of drums may be configured to rotate about a respective drum axis.

In some embodiments, the method may include locating the plurality of drums in a closed position. In the closed position, the slot of the corresponding drum may extend circumferentially relative to the central axis to block fluid communication between the gas path and the plenum through the slot.

In some embodiments, the method may include rotating the plurality of drums to a fully open position. In the fully open position, the slot of the corresponding drum may extend radially relative to the central axis to allow fluid communication between the gas path and the plenum through the slot.

These and other features of the present disclosure will become more apparent from the following description of the illustrative embodiments.

DETAILED DESCRIPTION OF THE DRAWINGS

Figure 1:
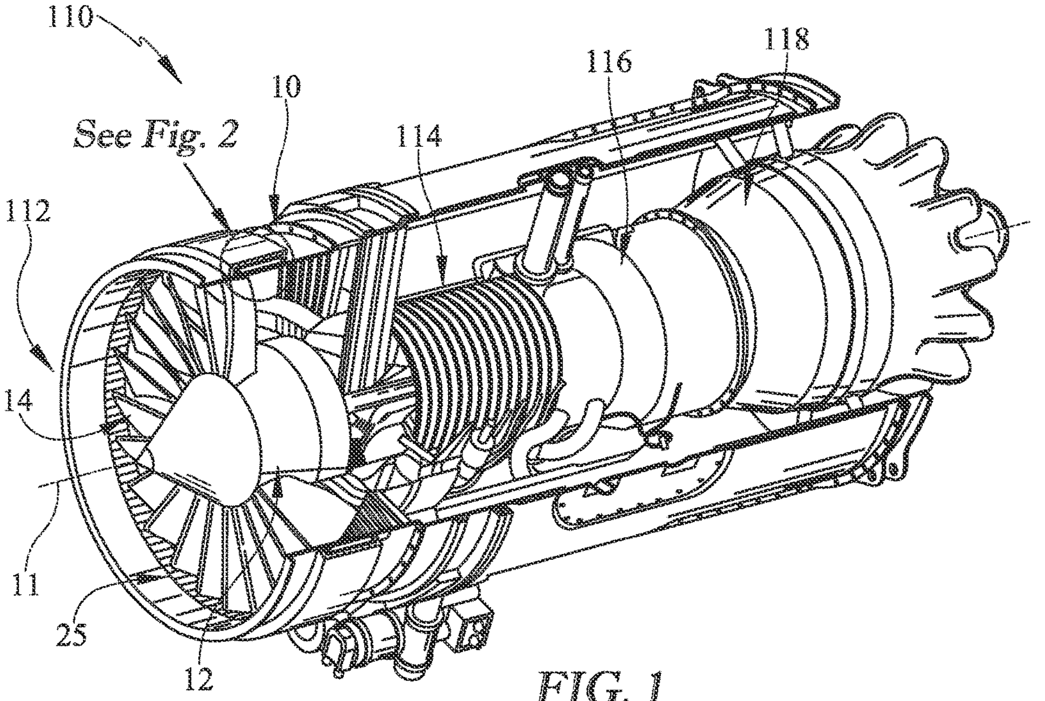
FIG. 1 is a cutaway view of a gas turbine engine that includes a fan, a compressor, a combustor, and a turbine, the fan including fan rotor configured to rotate about an axis of the engine and a fan case assembly that surrounds fan blades included in the fan rotor.

For the purposes of promoting an understanding of the principles of the disclosure, reference will now be made to a number of illustrative embodiments illustrated in the drawings and specific language will be used to describe the same.

A fan case assembly 10 is adapted for use in a gas turbine engine 110 as shown in FIG. 1. The gas turbine engine 110 includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about a central axis 11 of the gas turbine engine 110 and drive the compressor 114 and the fan 112.

The fan 112 includes a fan rotor 12 and a fan case assembly 10 as shown in FIG. 1. The fan rotor 12 has a number of fan blades 14. The fan case assembly 10 extends circumferentially around the fan blades 14 of the fan rotor 12 such that the fan case assembly 10 is aligned axially with the fan blades 14.

Figure 2:
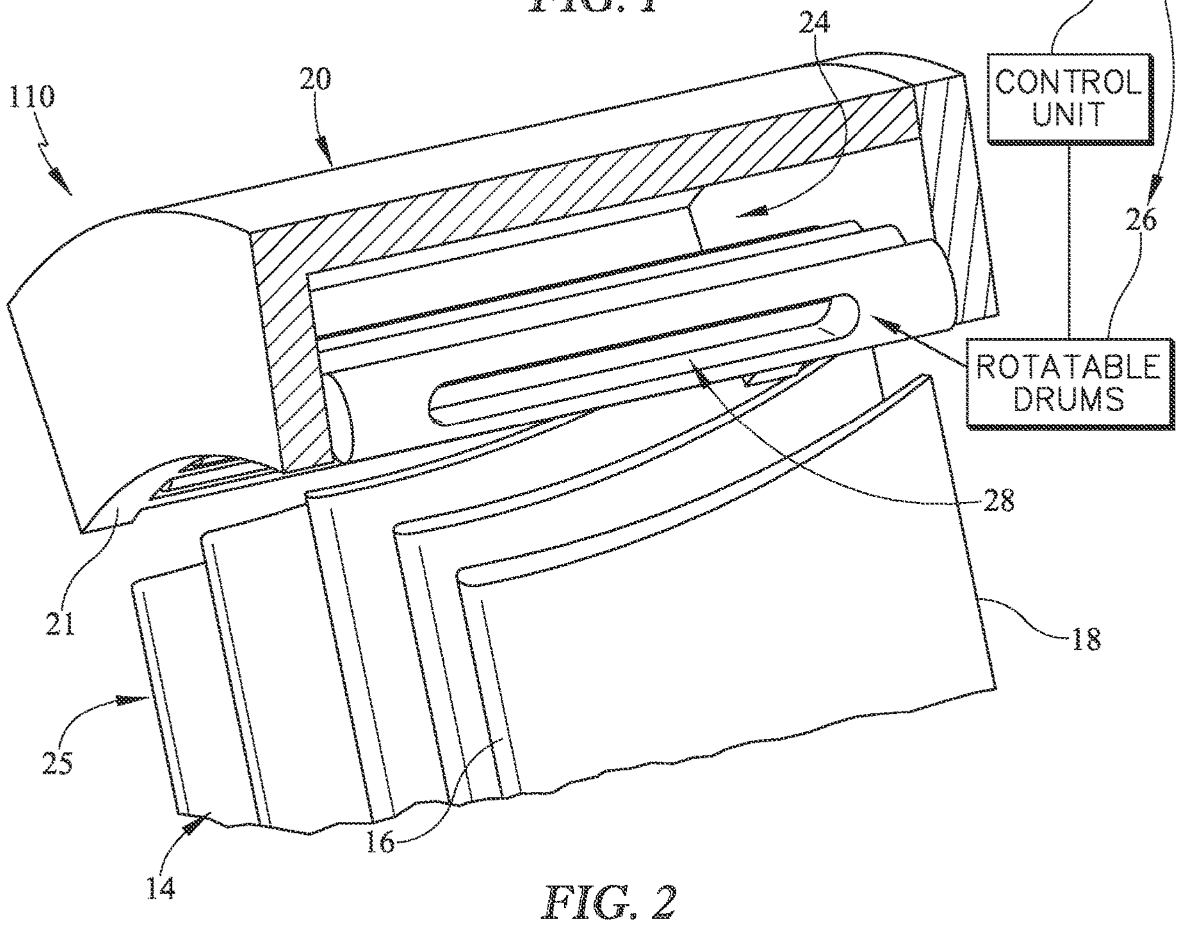
FIG. 2 is a detail view of the fan case assembly included in the gas turbine engine of FIG. 1 showing that the fan case assembly includes a case that extends circumferentially at least partway about a central axis of the engine radially outward of the fan blades to define an outer boundary of a gas path of the gas turbine engine and an inlet distortion mitigation system that includes a plurality of drums arranged in the plenum and configured to rotate about a respective drum axis between a closed position as shown in FIG. 7, partially open positions as shown in FIGS. 9 and 10, and a fully open position as shown in FIG. 8 to control fluid communication between the gas path and the plenum through slots formed in the plurality of drums and a control unit configured to rotate the plurality of drums between the different positions in response to preselected operating conditions to minimize negative effects of pressure and swirl distortions in the gas turbine engine to improve stall margin.
Figure 3:
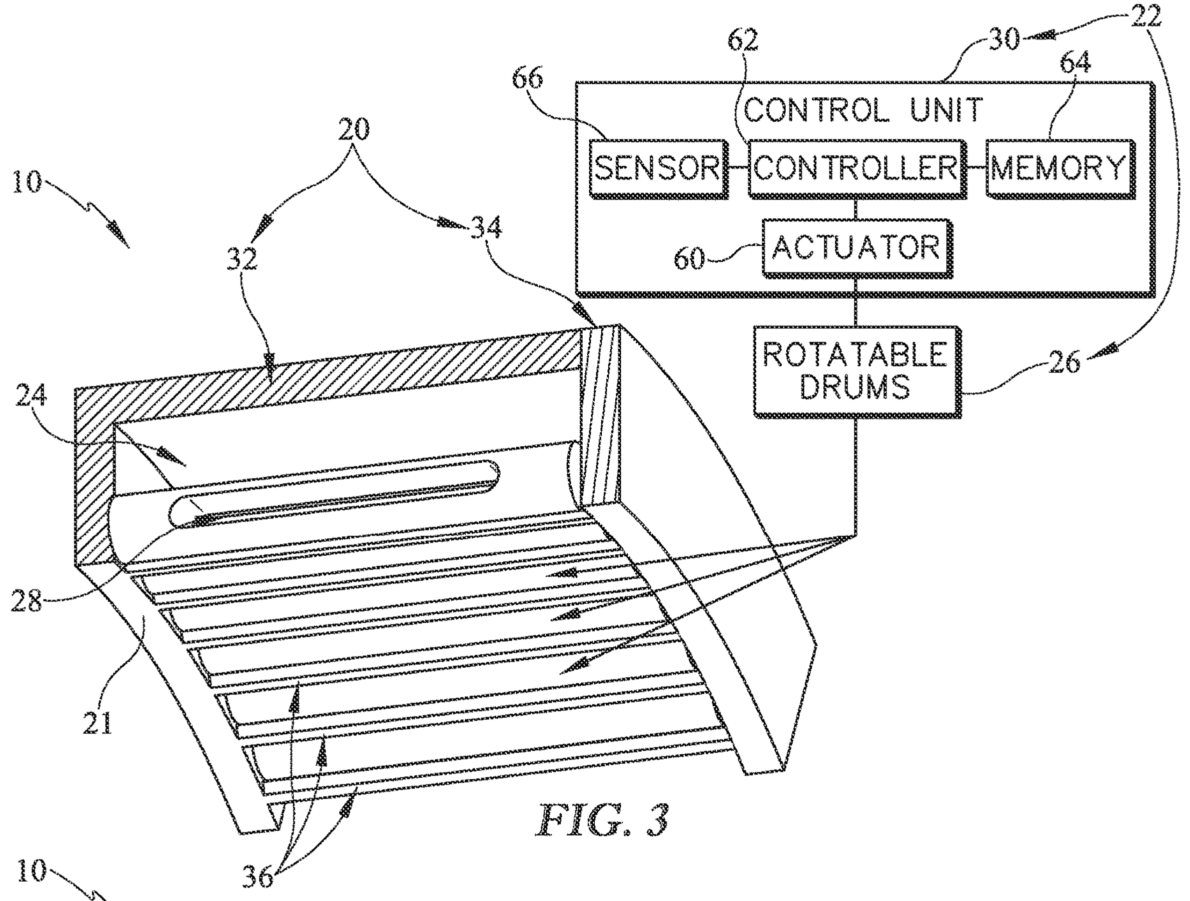
FIG. 3 is a perspective view of the fan case assembly of FIG. 2 showing the plurality of drums are spaced apart circumferentially about the central axis.
Figure 4:
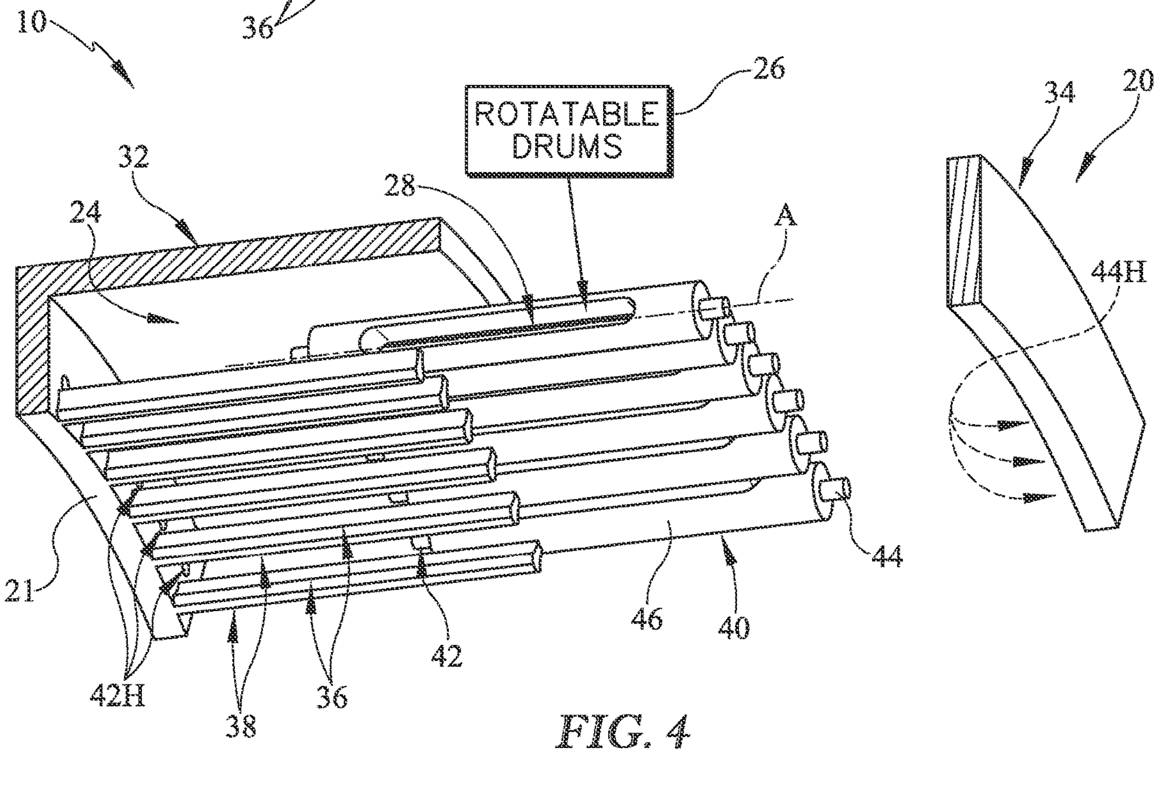
FIG. 4 is an exploded view of FIG. 3 showing the case includes a forward section and an aft section configured to be coupled to the forward section to trap the plurality of drums axially therebetween in the plenum, and further showing each of the drums includes a drum body that extends axially between opposite axial ends and a pair of pegs that extend axially from the opposite ends of the corresponding drum body to fit into peg holes formed in the forward and aft sections of the case.

The fan case assembly 10 includes, among other components, a case 20 and an inlet distortion mitigation system 22 as shown in FIGS. 2-4. The case 20 extends circumferentially at least partway about the central axis 11 to define an outer boundary of a gas path 25 of the gas turbine engine 110. The case 20 is formed to define a plenum 24 that extends circumferentially at least partway about the central axis 11 and is open to the gas path 25 of the gas turbine engine 110. The inlet distortion mitigation system 22 is configured to control fluid communication between the plenum 24 and the gas path 25 of the gas turbine engine 110.

The inlet distortion mitigation system 22 includes a plurality of rotatable drums 26 and a control unit 30 as shown in FIGS. 2-4. The plurality of drums 26 are rotatably coupled to the case 20 in the plenum 24 to rotate about a drum axis A. Each drum 26 of the plurality of drums 26 includes a slot 28 that extends completely through the corresponding drum 26 to allow airflow through the corresponding drum 26. The slots 28 extend axially partway along the drums 26 relative to the drum axis A.

Figure 5:
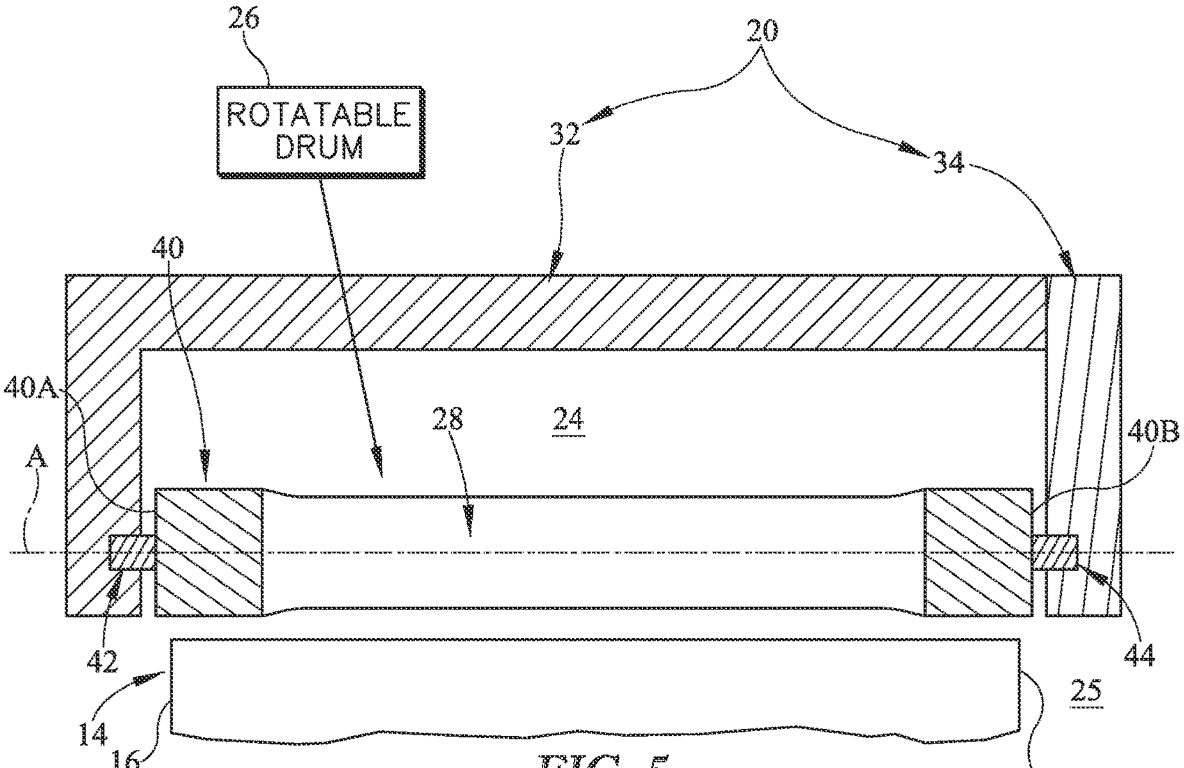
FIG. 5 is a circumferential cross-section view of the fan case assembly of FIG. 3 with the plurality of drums in the fully open position in which the slot of the corresponding drum extends radially relative to the central axis to open the slot to the gas path to allow fluid communication between the gas path and the plenum through the slot.
Figure 6:
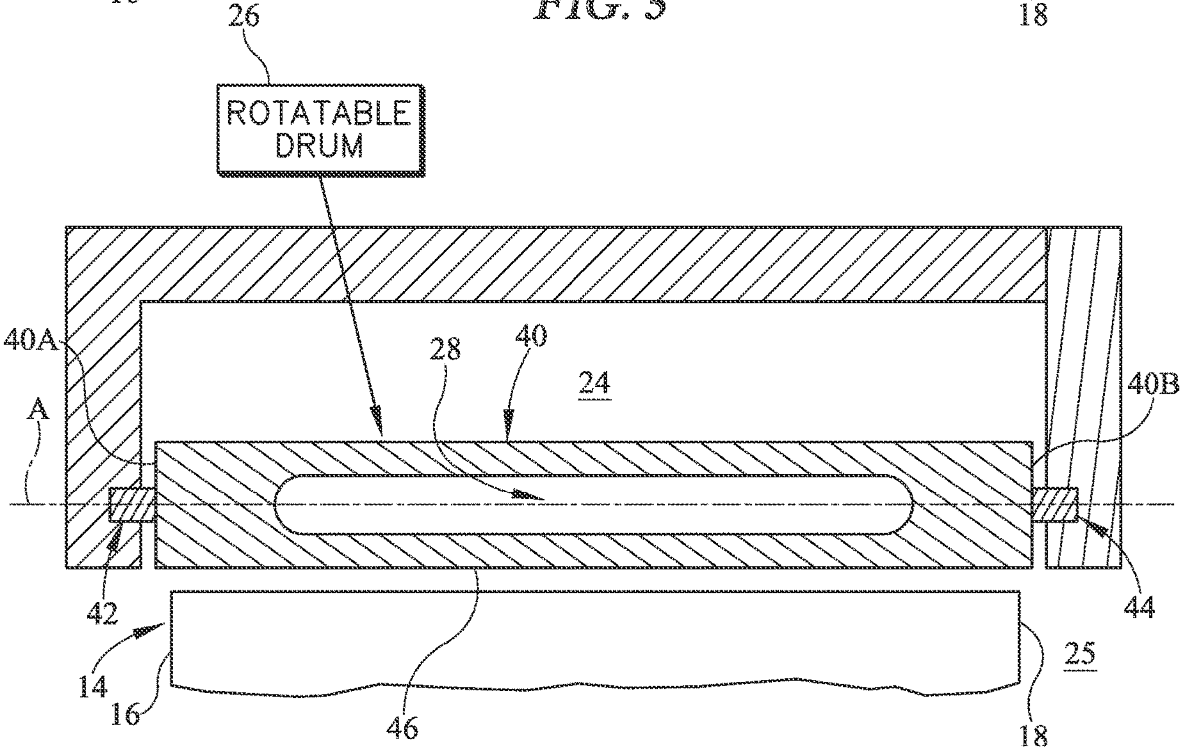
FIG. 6 is a circumferential cross-section view of the fan case assembly of FIG. 3 with the plurality of drums in the closed position in the closed position in which the slot of the corresponding drum extends circumferentially relative to the central axis to close off the slot from the gas path to block fluid communication between the gas path and the plenum through the slot.
Figure 7:
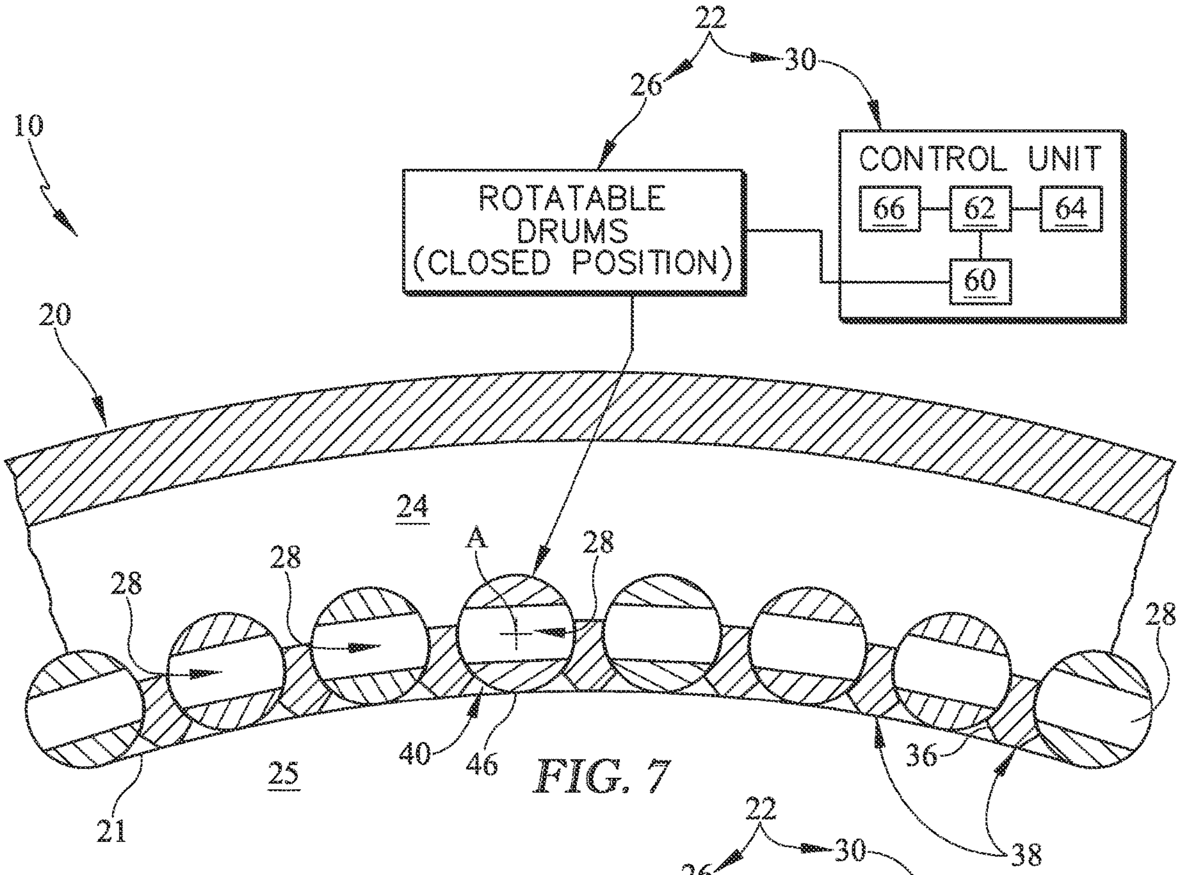
FIG. 7 is an axial cross-section view of the fan case assembly of FIG. 3 with the plurality of drums in the closed position in which the slot of the corresponding drum extends circumferentially relative to the central axis to close off the slot from the gas path so that an outer surface of the corresponding drum cooperates with an inner surface of the case to define a portion of the outer boundary and block fluid communication between the gas path and the plenum through the slot.
Figure 8:
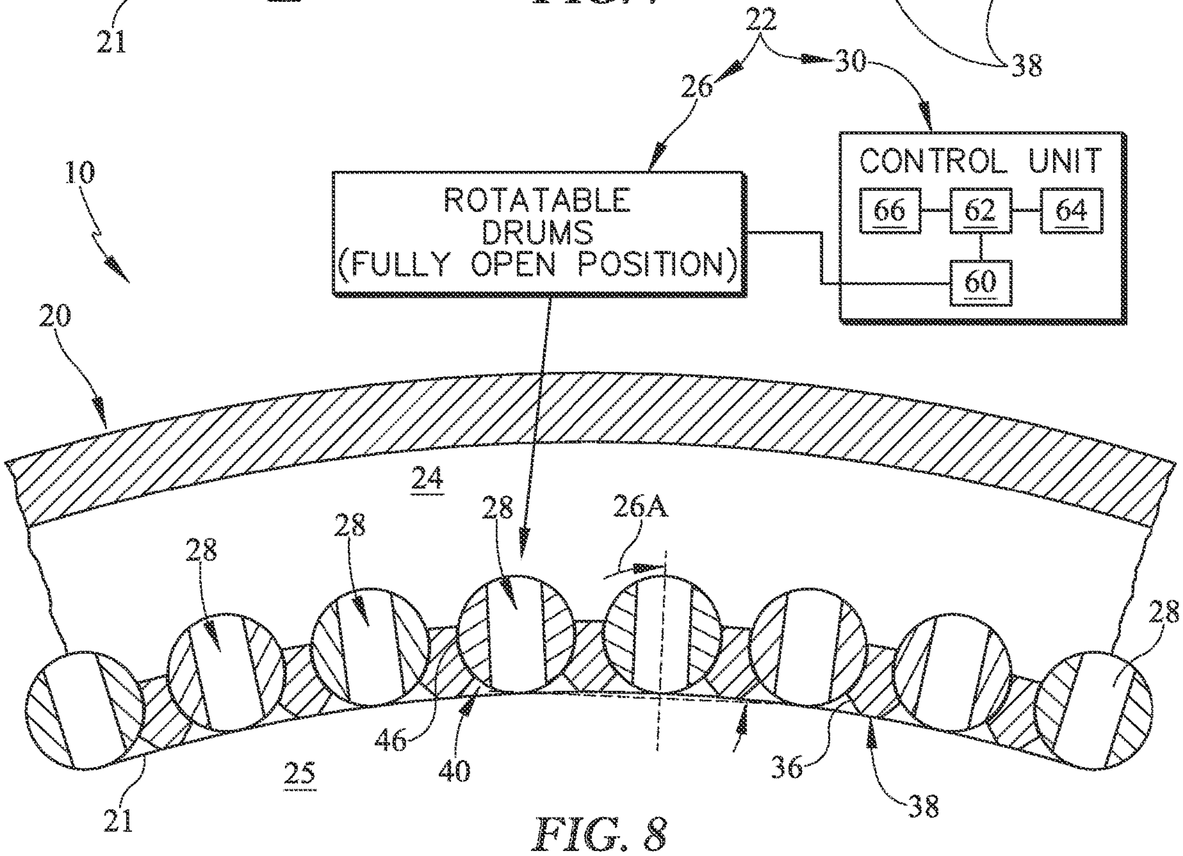
FIG. 8 is an axial cross-section view of the fan case assembly of FIG. 3 with the plurality of drums in the fully open position in which the slot of the corresponding drum extends radially relative to the central axis to open the slot to the gas path to allow fluid communication between the gas path and the plenum through the slot.
Figure 9:
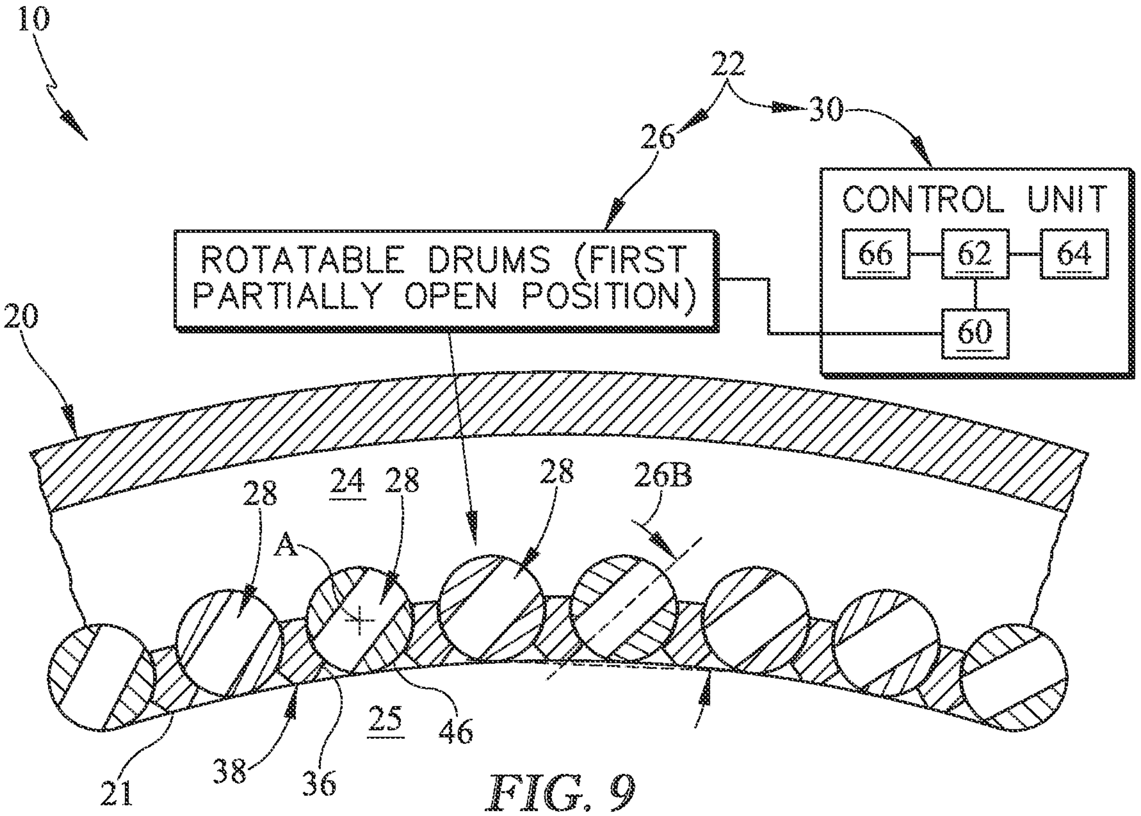
FIG. 9 is an axial cross-section view of the fan case assembly of FIG. 3 with the plurality of drums in one of the partially open positions included in the plurality of partially open positions between the closed position and the fully open position in which the slot is angled in a first circumferential direction.
Figure 10:
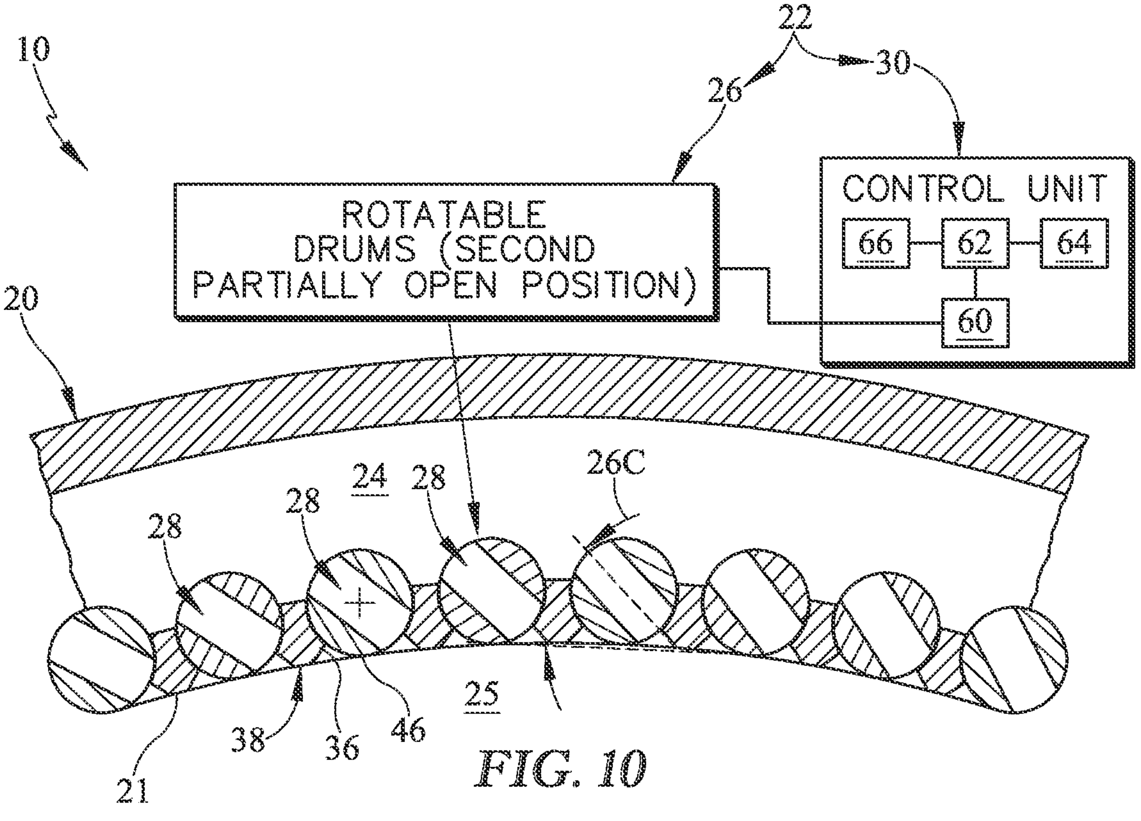
FIG. 10 is an axial cross-section view of the fan case assembly of FIG. 3 with the plurality of drums in another one of the partially open positions included in the plurality of partially open positions between the closed position and the fully open position in which the slot is angled in a second circumferential direction opposite to the first circumferential direction.

The drums 26 may be substantially cylindrical in shape, with a generally cylindrical outer surface 46. Additionally or alternatively, the drums 26 may be any shape capable of rotating between the various positions described herein and controlling a flow of air between the flow path 25 and the plenum 24. The plurality of drums 26 are each configured to rotate between a closed position as shown in FIGS. 6 and 7, a plurality of partially open positions as shown in FIGS. 9 and 10, and a fully open position as shown in FIGS. 5 and 8. The control unit 30 is configured to rotate each of the plurality of drums 26 about the corresponding drum axis A between the different positions in response to preselected operating conditions to control fluid communication between the plenum 24 and the gas path 25 so as to minimize the negative effects of pressure and swirl distortions in the gas turbine engine 110 to improve stall margin for the gas turbine engine 110.

Embedded engines on an aircraft may experience high distortion in the form of pressure gradients and swirl. The pressure and swirl distortions may cause engine stall or other undesirable aeromechanical behavior. Additionally, there may be points during a mission or moments with maneuvers where it may be desirable to incorporate a different available stall margin or to be able to more evenly distribute flows. Attempting to solve the worst stall condition while maintaining performance over all of the cycles or flight conditions may be difficult and result in compromised efficiency or a limited flight envelope.

Therefore, the fan case assembly 10 includes the inlet distortion mitigation system 22 which includes the plurality of drums 26 that rotate relative to the case 20 to control fluid communication between the plenum 24 and the gas path 25. In this way, the negative effects of pressure and swirl distortions are minimized to improve stall margin. The negative effects may include loss of efficiency or overall performance of the engine 110 and/or other negative operating conditions known to one of ordinary skill in the art.

In the closed position, the slot 28 of each corresponding closed drum 26 extends circumferentially relative to the central axis 11 to close off the slot 28 from the gas path 25 to block fluid communication between the gas path 25 and the plenum 24 through the slot 28 as shown in FIG. 7. In other words, in the closed position, the slot 28 extends relatively parallel to the inner surface 21 of the case 20. A portion of the outer surface 46 of each of the closed drums 26 cooperates with an inner surface 21 of the case 20 to define the outer boundary of the gas path 25. The outer surface 46 of each drum 26 forms a part of the outer boundary of the gas path 25 thereby covering any opening of the plenum 24 to block fluid communication between the gas path 25 and the plenum 24 when each of the drums 26 are in the closed position.

In the fully open position, the slot 28 of each corresponding fully open drum 26 extends radially relative to the central axis 11 to open the slot 28 to the gas path 25 to allow fluid communication between the gas path 25 and the plenum 24 through the slot 28 as shown in FIG. 8. In other words, in the fully open position, the slot 28 extends perpendicular to or at a 90° angle to the inner surface 21 of the case 20. Allowing fluid communication between the gas path 25 and the plenum 24 permits air pressure and flows to better equalize circumferentially about the fan 112 to improve stall margin.

The plurality of partially open positions are between the closed position and the fully open position. In any one of the partially open positions, the slot 28 of each drum 26 extends at an intermediate angle 26B, 26C relative to the gas path 25 as shown in FIGS. 9 and 10. In other words, in one of the partially open positions, the slot 28 of each drum 26 is angled such that the slot 28 extends radially and circumferentially relative to the central axis 11. The intermediate angle 26B, 26C is between the angle of the slot 28 when it is in the closed position and extending circumferentially relative to the central axis 11 and the angle of the slot 28 when it is in the fully opened position and extending radially relative the central axis 11, perpendicular to the inner surface 21 of the case 20.

In the plurality of partially open positions, the slot 28 may be partially blocked by a portion of the case 22 so as to vary the fluid communication between the gas path 25 and the plenum 24. Each of the drums 26 may be rotated between any one of the plurality of partially open positions, so as to modulate the size of the opening of the slot 28 open to the gas path 25 thereby varying the fluid communication between the gas path 25 of the gas turbine engine 110 and the plenum 24.

In the plurality of partially open positions, the slot 28 may be angled to direct flow from the gas path 25 into the plenum 24 in either a first circumferential direction as shown in FIG. 9 or a second circumferential direction opposite to the first circumferential direction as shown in FIG. 10. The plurality of partially open positions includes a first partially open position as shown in FIG. 9 and a second partially open position as shown in FIG. 10. In the first partially open position, the slot 28 of the corresponding drum 26 is angled in a first circumferential direction about the central axis 11. In the second partially opened position, the slot 28 of the corresponding drum 26 is angled in a second circumferential direction about the central axis 11. In some embodiments, one of the circumferential directions, for example, the first circumferential direction, is aligned with an advancing motion of the blades 12 they rotate around the fan rotor 12 and angled so air is directed by the advancing blades 12 from the flow path 25 directly into the plenum 24. In some embodiments, the other circumferential direction, for example, the second circumferential direction, is aligned with a retreating motion of the blades 12 and angled to direct air flowing out of plenum 24 back into the gas path 25.

The control unit 30 is configured to rotate the drums 26 between the different positions in response to preselected operating conditions. The preselected operating conditions include a plurality of preprogrammed aircraft maneuvers stored on a memory 64 included in the control unit 30. The plurality of preprogrammed aircraft maneuvers include banks, turns, rolls, etc.

The control unit 30 is configured to detect a preprogrammed aircraft maneuver included in the plurality of preprogrammed aircraft maneuvers on the memory 64. Once the preprogrammed aircraft maneuver is detected, the control unit 30 directs each of the drums 26 to rotate to a corresponding position in response to detecting the preprogrammed aircraft maneuver.

For example, the plurality of drums 26 may normally be in the closed position during a cruise condition so that no additional stall margin is created, but performance is not compromised. The cruise condition included in the preselected operating conditions corresponds to when the aircraft is in the cruise portion of the flight cycle.

Then, when the control unit 30 detects a preprogrammed aircraft maneuver, i.e. banks, turns, rolls, the control unit 30 directs the drums 26 to rotate to one of the partially open positions or to the fully open position so that flow is permitted through the slots 28 and into the plenum 24. This permits air pressure and flows to better equalize circumferentially around the fan 112 thereby minimizing the negative effects of pressure and swirl distortions to improve stall margin.

The control unit 30 is configured to direct some or all of the drums 26 to rotate from the closed position to one of the partially open positions or to the fully open position based on the detected preprogrammed aircraft maneuver. Depending on the preprogrammed aircraft maneuver, the control unit 30 may direct only certain drums 26 to move to one of the partially open positions or the fully open position, while keeping others in the closed position.

Additionally, the control unit 30 may direct some of the drums 26 to remain in the closed position, while directing some of the drums 26 to rotate to the fully opened position and others to one of the partially open positions. The control unit 30 is configured to direct some of the drums 26 to rotate to one of the partially open position while others are rotated to another one of the partially open position. In other words, the control unit 30 is configured to individual vary the angle of the slot 28 or position of each of the drums 26.

The preselected operating conditions may further include a sensor input from at least one sensor 66 included in the control unit 30. The sensor 66 is configured to measure one of pressure, air speed, altitude, blade tip timing, blade rotational speed, attitude or aircraft orientation, and acceleration. In some embodiments, the control unit 30 includes a plurality of sensors 66 each configured to measure one of pressure, air speed, and acceleration.

The control unit 30 is configured to receive a measurement from the at least one sensor 66 or sensors 66 and direct the drums 26 to rotate to a corresponding position in response to the measurement of the at least one sensor 66. The control unit 30 may be configured to rotate the drums 26 to be in the closed position when the measurements from the sensor 66 are within a predetermined threshold.

Then, when the measurement from the sensor 66 is outside of the predetermined threshold, the control unit 30 directs the drums 26 to rotate to one of the partially open positions or the fully open position. Based on the difference of the measurement from the sensor 66 compared to the predetermined threshold, the control unit 30 may vary the position of the drums 26 to control the amount of fluid communication between the gas path 25 and the plenum 24 through the openings of the slots 28 of the drums 26.

The control unit 30 is configured to direct some or all of the drums 26 to rotate from the closed position to one of the partially open positions or the fully open position based on the measurement from the sensor 66. The control unit 30 may direct some of the drums 26 to remain in the closed position, while directing some of the drums 26 to rotate to the fully opened position and others to a partially open position based on the measurement from the sensor 66.

In some embodiments, the control unit 30 may be configured to use a combination of the sensor measurements and the detected preprogrammed aircraft maneuver to control the position of the plurality of drums 26. For example, when the control unit 30 detects a preprogrammed aircraft maneuver and the measurement is outside of the predetermined threshold, the control unit 30 directs some or all of the drums 26 to rotate to one of the partially open positions or the fully open position. The control unit 30 is configured to direct some of the drums 26 to rotate to one partially open position while others are rotated to another partially open position. The control unit 30 is configured to individual vary the angle of the slot 28 of each of the drums 26.

In some embodiments, the control unit 30 is configured to use the measurements from the sensor 66 to anticipate the aircraft maneuver. The control unit 30 is configured to direct some or all of the plurality of drums 26 to move to one of the partially open positions or the fully open position in response to the measurement from the sensor 66 even though no preprogrammed aircraft maneuver is detected.

Alternatively, there may be a delay in the measurements from the sensor 66. Therefore, the control unit 30 is also configured to direct some or all of the drums 26 to move to one of the partially open positions or the fully open position when the one of the preprogrammed aircraft maneuvers is detected, even though the measurements from the sensor 66 are within the predetermined thresholds.

In some embodiments, the control unit 30 may detect one of the preprogrammed aircraft maneuvers, but the measurements from the sensors 66 are within the predetermined threshold. If so, the control unit 30 may direct some or all of the drums 26 to remain in the current position.

Turning again to the fan case assembly 10, the fan case assembly 10 extends circumferentially at least partway about the central axis 11 in the illustrative embodiment. In some embodiments, the fan 112 may include multiple fan case assemblies 10 arranged circumferentially about the axis 11 to form a full hoop. In other embodiments, the fan case assembly 10 may be annular and extends circumferentially about the axis 11. In some embodiments, the case 20 may extend around the axis 11, while the plenum 24 only extends partway about the axis 11.

In some embodiments, the fan 112 may include multiple fan case assemblies 10 spaced apart circumferentially about the axis 11 to define segments between each fan case assembly 10. The segments between the fan case assemblies 10 may not have a plenum 24 so that the plenums 24 of each of the fan case assemblies 10 are independent from each other.

The case 20 includes a forward section 32 and an aft section 34 as shown in FIG. 4. The aft section 34 is configured to be coupled to the forward section 32 to trap the plurality of drums 26 axially therebetween in the plenum 24.

In the illustrative embodiment, the plenum 24 is formed in the case 22 so that the plenum 24 extends axially across the tips of the fan blades 14 between a leading edge 16 and a trailing edge 18 of the fan blades 14 as shown in FIGS. 2, 5, and 6. Each drum 26 extends axially across the tips of the fan blades 14. The slot 28 of each drum 28 extends between the leading edge 16 and the trailing edge 18 in the illustrative embodiment. In some embodiments, the slot 28 may extend forward/aft of the leading and trailing edges 16, 18.

Figure 14:
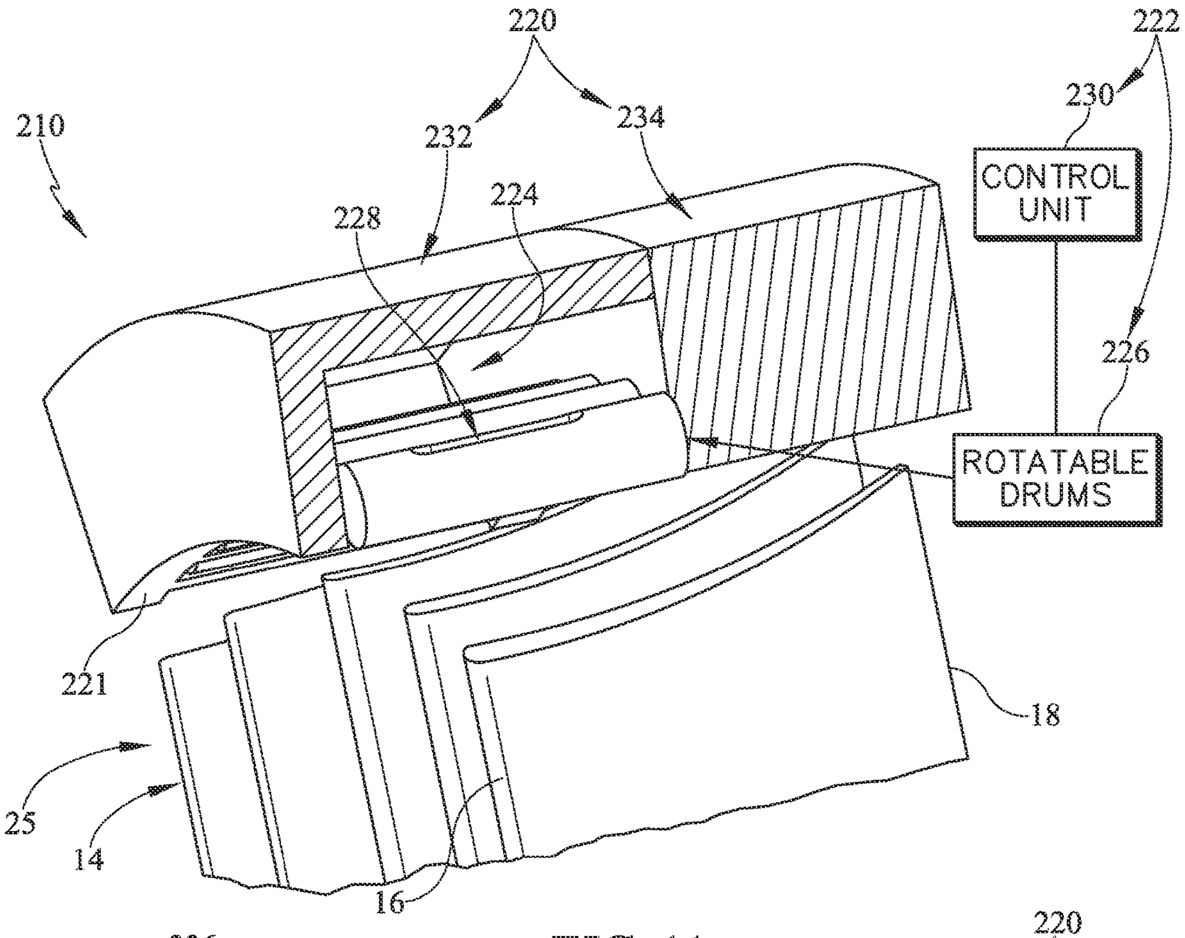
FIG. 14 is a perspective, circumferential cross-section view of another embodiment of a fan case assembly included in the gas turbine engine of FIG. 1 showing the plenum and the plurality of drums are disposed at or near the leading edge of the fan blades.
Figure 15:
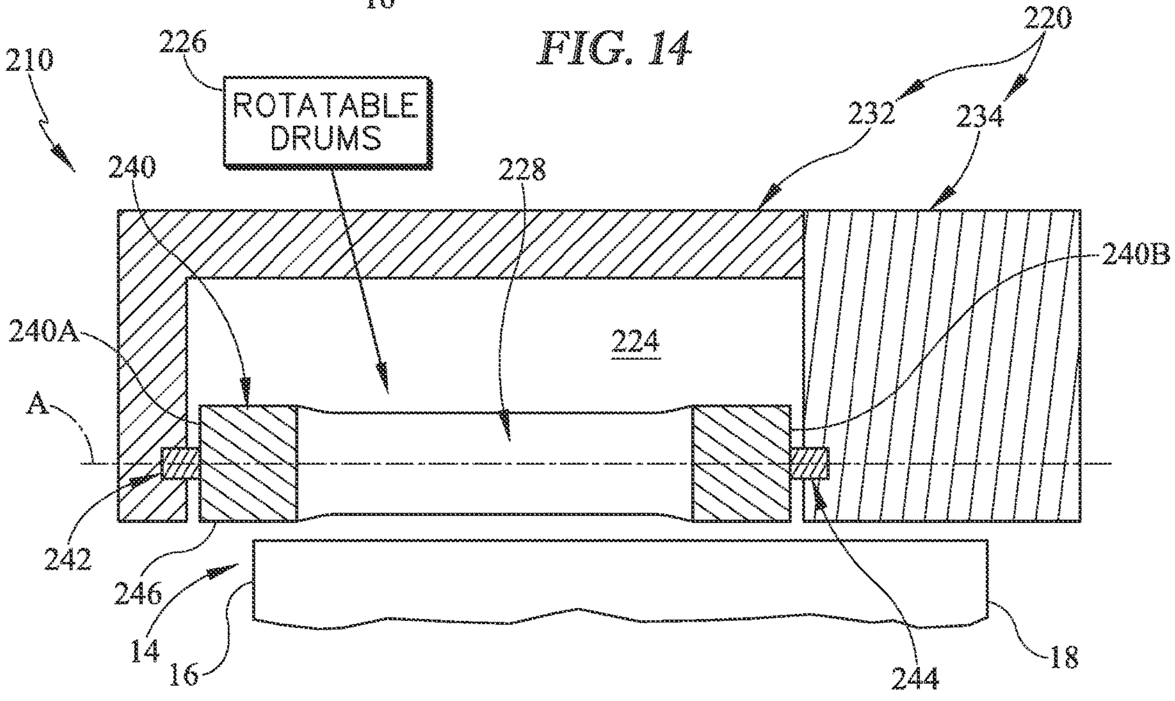
FIG. 15 is a circumferential cross-section view of the fan case assembly of FIG. 14 showing the slot formed in each drum of the plurality of drums is located at or near leading edge of the fan blades.
Figure 16:
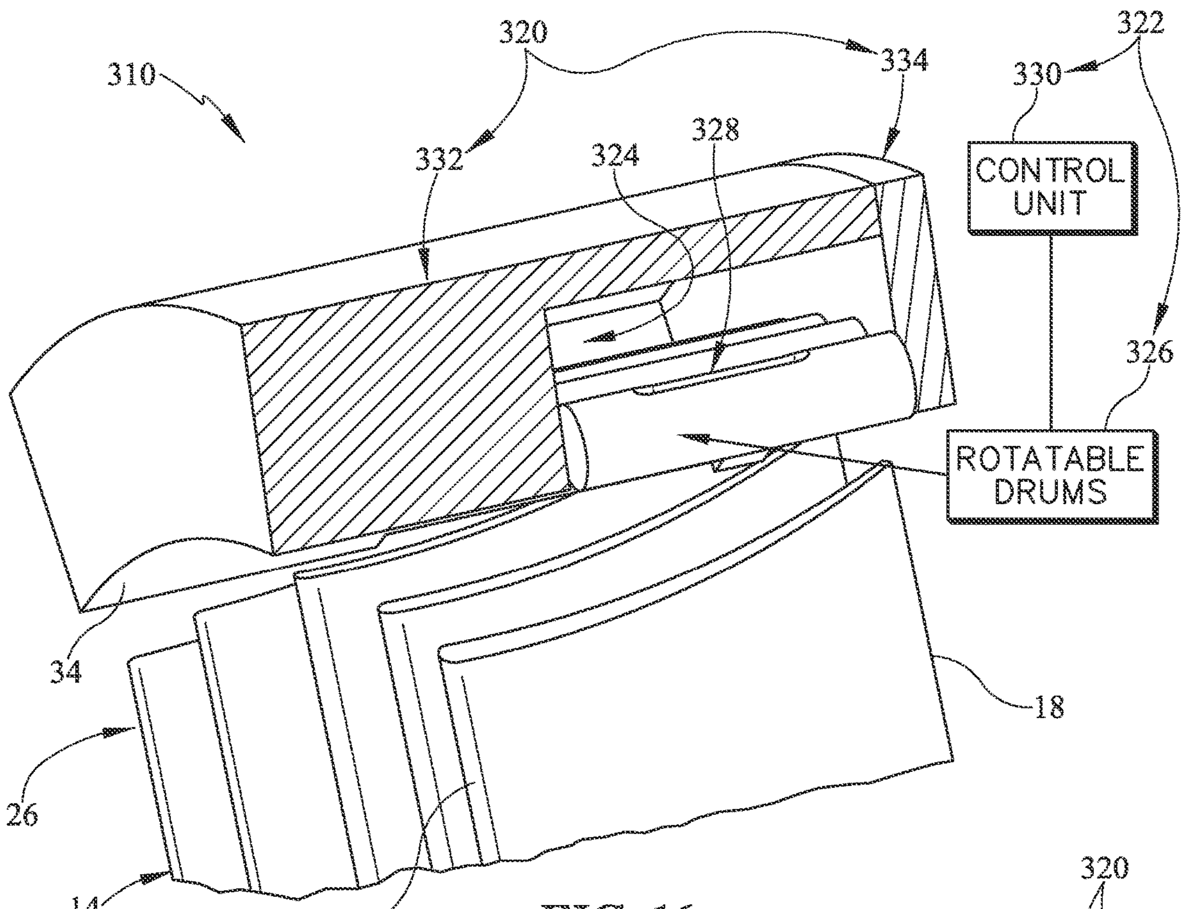
FIG. 16 is a perspective, circumferential cross-section view of another embodiment of a fan case assembly included in the gas turbine engine of FIG. 1 showing the plenum and the plurality of drums are disposed at or near the trailing edge of the fan blades.
Figure 17:
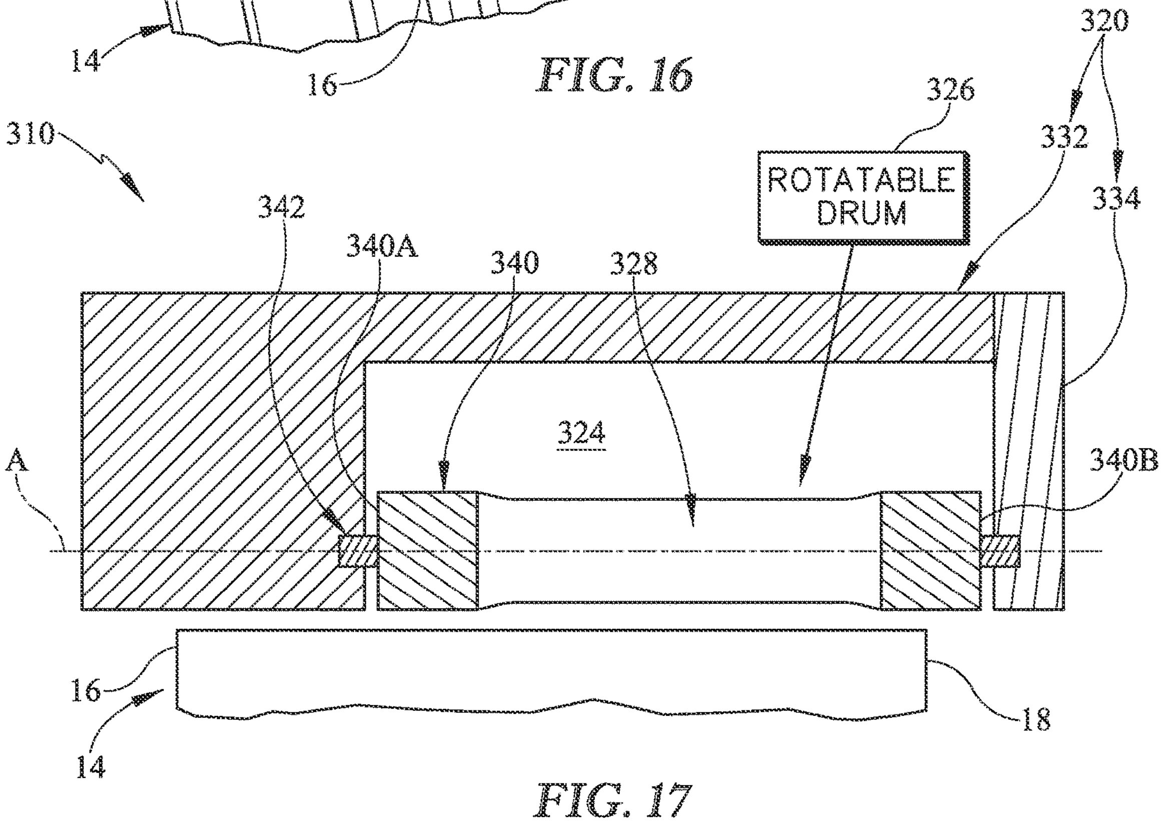
FIG. 17 is a circumferential cross-section view of the fan case assembly of FIG. 16 showing the slot formed in each drum of the plurality of drums is located at or near trailing edge of the fan blades.

In some embodiments, like as shown in FIGS. 14 and 15, the plenum is disposed at or near the leading edge 16 of the fan blades 14 and the slot formed in each drum is disposed at or near the leading edge 16. In some embodiments, like as shown in FIGS. 16 and 17, the plenum is disposed at or near the trailing edge 18 of the fan blades 14 and the slot formed in each drum is disposed at or near the trailing edge 18.

In the illustrative embodiment, the plenum 24 has a rectangular cross-sectional shape. In some embodiments, the plenum 24 may have a forward-leaning cross-sectional shape. In other embodiments, the plenum 24 may have another cross-sectional shape.

In the illustrative embodiment, the case 20 is formed to include a plurality of openings 36 that open to the gas path 25 and the plenum 24 as shown in FIGS. 3, 4, and 7-13. The openings 36 are spaced apart circumferentially about the central axis 11 to define partitions 38 in the case 22. Each drum 26 is arranged in the plenum 24 so that the drum 26 is aligned with one of the openings 36 and each partition 38 is arranged between adjacent drums 26 as shown in FIGS. 7-13. In the illustrative embodiment, each of the drums 26 extends partway into the corresponding opening 36. In this way, the outer surface 46 of each drum 26 cooperates with the inner surface 21 of the case 22 to define the outer boundary of the gas path 25.

It will be understood that the spacing of the drums 26 in FIGS. 1-13 are not to scale. For example, the drums 26 may be circumferentially spaced closer together or may be circumferentially spaced further apart in some embodiments.

In some embodiments, the plenum 24 formed in the case 22 may completely open to the gas path 25 such that there are no partitions 38. The drums 26 may be arranged closer together to minimize gaps there between and prevent fluid communication between the gas path 25 and the plenum 24. In some embodiments, the assembly may include seals between adjacent drums 26 to limit leakage therebetween. In some embodiments, the partitions 38 may be formed between some, but not every drum 26.

If the case 22 is a split case, like as shown in FIG. 4, the partitions 38 may be included in the forward case 32. In some embodiments, the partitions 38 may be part of the aft case 34. In some embodiments, the partitions 38 may be included in both the forward and aft cases 32, 34. The partitions 38 may partially block the slot 28 of the drums, for example, when the drums are in one of the partially opened positions as shown in FIGS. 9 and 10. The partitions 38 may be at least partially contoured to the shape of the drums 26 to seal or block a flow of fluid between the gas path 25 and the plenum 24 when the drums 26 are in the closed position, while still allowing all or partial flow between the gas path 25 and the plenum 24 when the drums 26 are in the fully open or partially open position.

The inlet distortion mitigation system 22 includes the plurality of drums 26 and the control unit 30 as shown in FIGS. 2-4. Each of the drums 26 includes a drum body 40 and a pair of pegs 42, 44 as shown in FIG. 4. The drum body 40 extends between a first axial end 40A and a second axial end 40B spaced apart axially from the first axial end 40A. The drum body 40 defines an outer surface 46 that extends between the first and second axial ends 40A, 40B. The pair of pegs 42, 44 each extend from one of the axial ends 40A, 40B of the drum body 40 to the case 20 to couple the respective drum 26 to the case 20. The pair of pegs 42, 44 extend axially from the first and second axial ends 40A, 40B of the drum body 40 to fit into peg holes 42H, 44H formed in the forward and aft sections 32, 34 of the case 20.

The drum body 40 is formed to define the slot 28 as shown in FIGS. 3-6. The slot 28 extends entirely through the drum body 40 axially between the first and second axial ends 40A, 40B of the drum body 40.

The drums 26 are rotatable between the closed position, the partially open positions, and the fully open position to control fluid communication between the gas path 25 and the plenum 24. The drums 26 are rotated about the respective drum axis A to change the angle or position of slot 28 of the drums 26 relative to the gas path 25, thereby exposing the slots 28 to the gas path 25 to direct flow into the plenum 24.

In the closed position, the slot 28 of each drum 26 is positioned to extend circumferentially relative to the central axis or parallel to the inner surface 21 of the case 20. In the fully open position, the slot 28 of each drum 26 is positioned to extend radially relative to the central axis or perpendicular to the inner surface 21 of the case 20. In any one of the partially open positions, the slot 28 of each drum 26 extends radially and circumferentially so that the slot 28 is angled relative to the gas path 25.

In the fully open position, the slot 28 is at the fully open angle 26A as shown in FIG. 8. In the illustrative embodiment, the fully open angle 26A is about 90 degrees. In any one of the partially open positions, the slot 28 of each drum 26 is at an intermediate angle 26B, 26C. The intermediate angle 26B, 26C is anywhere between the position of the slot 28 in the closed position and the fully open angle 26A of the slot 28 when in the fully opened position. The intermediate angle 26B is the angle of the slot 28 when the slot 28 is angled in the first circumferential direction as shown in FIG. 9 and the intermediate angle 26C is the angle of the slot 28 when the slot 28 is angled in the second circumferential direction as shown in FIG. 10.

In the illustrative embodiment, the plurality of drums 26 may rotate in either direction about the drum axis A between the different positions. In some embodiments, the plurality of drums 26 may be configured to rotate in a first direction about the drum axis A from the closed position to one of the partially open positions or the fully open position. The drums 26 may be configured to rotate in a second direction about the drum axis A opposite the first direction to go back to the closed position. In some embodiments, the drums 26 may be configured to continue to rotate in the first direction to go back to the closed position.

The plurality of drums 26 may be configured to rotate in the second direction about the drum axis A from the closed position to one of the partially open positions or the fully open position. The drums 26 may be configured to rotate in the first direction about the drum axis A opposite the second direction to go back to the closed position. In some embodiments, the drums 26 may be configured to continue to rotate in the second direction to go back to the closed position.

In some embodiments, each of the drums 26 may be configured to rotate 180 degrees about the drum axis A. The plurality of drums 26 may configured to rotate in the first direction 180 degrees about the drum axis A from the closed position to another closed position with the drum 26 flipped. The plurality of drums 26 may configured to rotate in the second direction 180 degrees about the drum axis A from the closed position back to the original closed position with the drum 26. In some embodiments, each of the drums 26 may be configured to rotate 360 degrees about the drum axis A in either the first direction and/or the second direction.

The control unit 30 includes at least one actuator 60, a controller 62, a memory 64, and at least one sensor 66 as shown in FIGS. 3 and 7-12. The actuator 60 is coupled to drums 26. The actuator 60 is configured to drive the rotating motion of the drums 26. The controller 62 is coupled to the actuator 60 to direct the actuator 60 to rotate the drums 26 between the different positions.

The actuator 60 is configured to rotate the drums 26 between the closed position as shown in FIG. 7, the plurality of partially open positions as shown in FIGS. 9 and 10, and the fully open position as shown in FIG. 8. The controller 62 is configured to direct the actuator 60 to rotate the drums 26 between the different positions in response to preselected operating conditions. The preselected operating conditions include the plurality of preprogrammed aircraft maneuvers stored on the memory 64 included in the control unit 30.

The controller 62 of the control unit 30 is configured to detect a preprogrammed aircraft maneuver included in the plurality of preprogrammed aircraft maneuvers on the memory 64. Once the preprogrammed aircraft maneuver is detected, the controller 62 directs the actuator 60 to rotate some or all of the drums 26 to a corresponding position in response to detecting the preprogrammed aircraft maneuver.

An extension linkage or rod may be coupled to one of the pegs 42, 44 at and end of each drum 26 that may be directly or indirectly coupled to the actuator 60. A crank may be positioned outside of the fan case 20, and may link the actuator 60 to the drums 26. The drums 26 may be ganged together, for example, with gears, a curved rack, and/or a belt. Additionally or alternatively, a motor may be disposed at the end of each drum 26 for individual control of the drums 26, and may be included in the fan case 20.

In some embodiments, multiple drums 26 may be coupled together to sync movement of the drums 26. The drums 26 may be coupled or linked together so that when the controller 62 directs the actuator 60 to rotate the drums 26, the actuator 60 moves to simultaneously rotate the plurality of coupled drums 26 to the desired position.

In some embodiments, different sets of drums 26 may be coupled together. The control unit 30 may include multiple actuators 60 each coupled to a respective different set of coupled drums 26 to control the positions of the drums 26 in groups so that some of the drums 26 move together in unison, while other drums 26 are independently controlled from the first group.

In some embodiments, the control unit 30 includes a separate actuator 60 for each drum 26. Each actuator 60 may be coupled to one of the respective drums 26. In this way, the controller 62 independently controls the position of each drum 26.

In some embodiments, the actuator 60 may include pneumatic or electric actuators, or combinations of hydraulic, pneumatic, and electric. Any other actuator known to a person skilled in the art could be utilized as well.

The controller 62 of the control unit 30 is configured to direct the actuator(s) 60 to rotate some or all of the drums 26 from the closed position to one of the partially open positions or to the fully open position based on the detected preprogrammed aircraft maneuver. As shown in FIG. 8, the controller 62 has directed the actuator(s) 60 to rotate all of the drums 26 to the fully opened position. As shown in FIG. 9, the controller 62 has directed the actuator(s) 60 to rotate all of the drums 26 to a first partially opened position to and direct gases flowing into the plenum 24 in the first circumferential direction. As shown in FIG. 10, the controller 62 has directed the actuator(s) 60 to rotate all of the drums 26 to a second partially opened position to direct gases flowing into the plenum 24 in the second circumferential direction.

Figure 12:
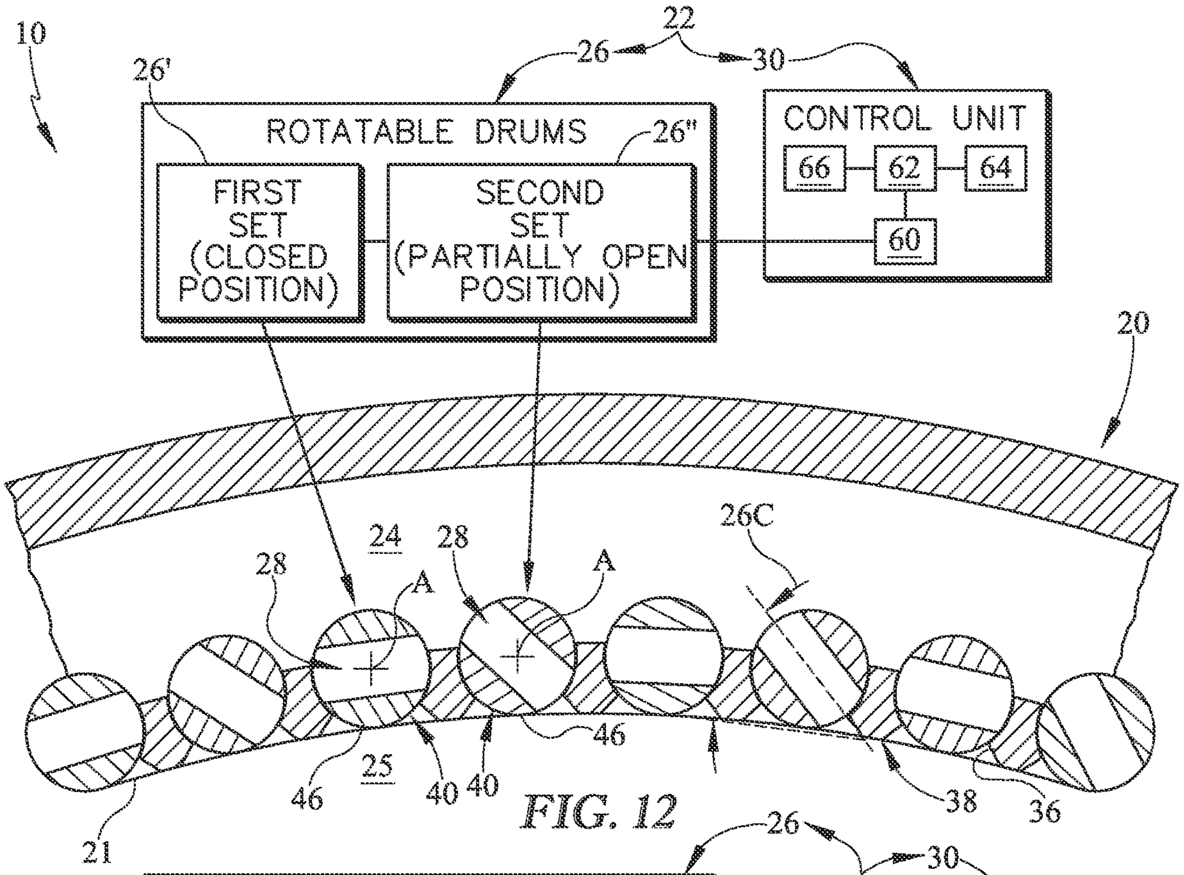
FIG. 12 is an axial cross-section view of the fan case assembly of FIG. 3 showing the plurality of drums may be rotated in different sets, the sets of drums includes a first set of drums and a second set of drums alternated circumferentially between the first set of drums, and further showing the first set of drums located in the closed position like as shown in FIG. 7 while the second set of drums are located in one of the plurality of partially open positions like as shown in FIG. 10.
Figure 13:
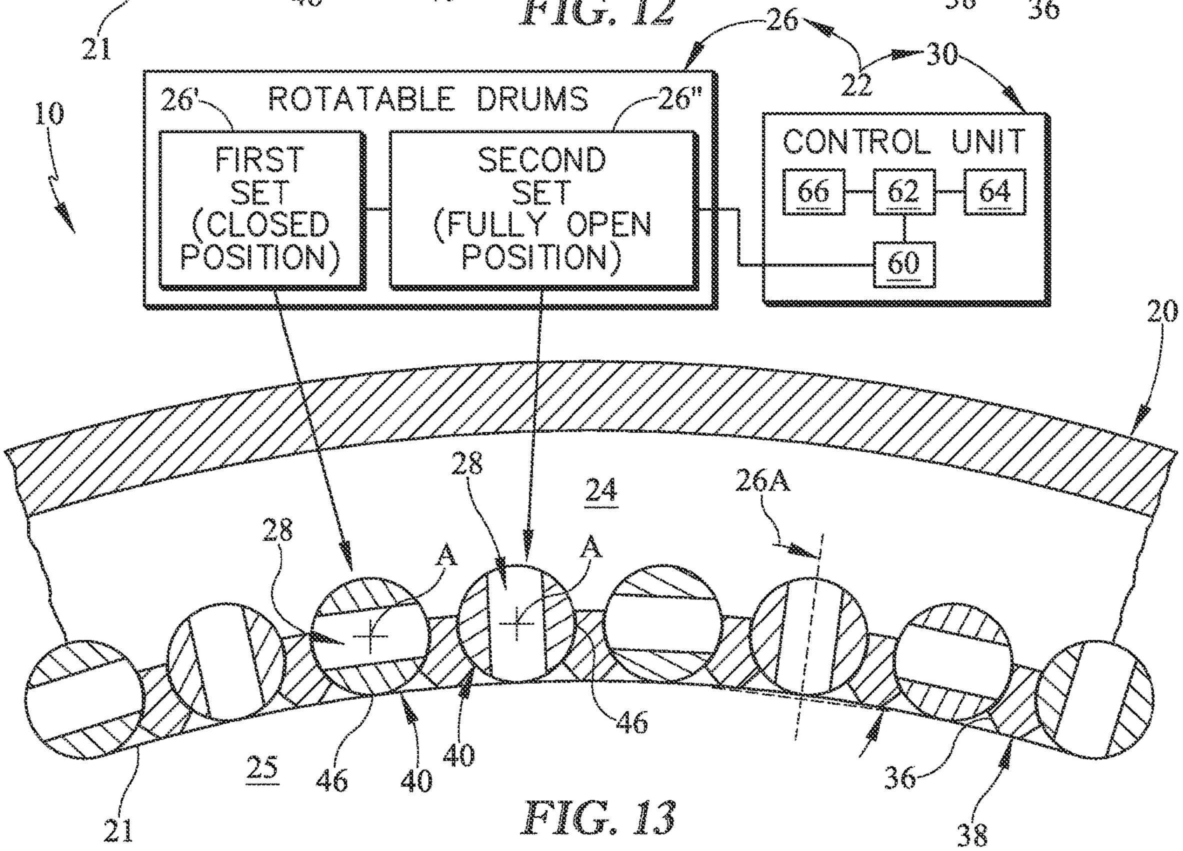
FIG. 13 is an axial cross-section view of the fan case assembly of FIG. 3 showing the first set of drums included in the plurality of drums is in the closed position like as shown in FIG. 7 while the second set of drums is in the fully opened position.

Depending on the preprogrammed aircraft maneuver, the controller 62 of the control unit 30 may direct certain actuators 60 to only rotate certain drums 26 to one of the partially open positions or to the fully open position, while keeping others in the closed position. As shown in FIG. 12, the controller 62 has directed the actuator(s) 60 to rotate some of the drums 26, or a first set of drums 26', to one of the partially open positions, while keeping other drums 26, or a second set of drums 26", in the closed position. As shown in FIG. 13, the controller 62 has directed the actuator (s) 60 to rotate some of the drums 26, or the first set of drums 26', to one of the fully open position, while keeping other drums 26, or a second set of drums 26", in the closed position.

In the illustrative embodiment, the first set of drums 26' is alternated between the second set of drums 26" as shown in FIGS. 12 and 13. In some embodiments, the different sets 26', 26" are arranged in series. In some embodiments, the different sets 26', 26" are arranged in groups spaced apart circumferentially. In some embodiments, the different sets 26', 26" may have drums 26 located at different circumferential locations spaced about the axis 11.

In the illustrative embodiment, the number of drums 26 in the first set of drums 26' is equal to the number of drums 26 in the second set of drums 26". In some embodiments, the number of drums 26 in one set 26', 26" may be less than or greater than the number of drums 26 in the other set 26', 26". In some embodiments, the controller 62 may not control the drums 26 in sets, but rather direct certain actuator(s) 60 to rotate certain drum(s) 26 to one of the partially open positions or to the fully open position, while keeping other drums 26 in the closed position.

Additionally, the controller 62 of the control unit 30 may direct the actuator(s) 60 to keep some of the drums 26 to in the closed position, while rotating some of the drums 26 to the fully opened position and others to a partially open position. The controller 62 of the control unit 30 is configured to direct the actuator(s) 60 to rotate some of the drums 26 to one partially open position while rotating others to another partially open position. In other words, the control unit 30 is configured to individual vary the angle of each of the slots 28 of the drums 26.

The controller 62 of the control unit 30 may be configured to direct the actuator(s) 60 to rotate some of the drums 26 to one partially open position while rotating others to another partially open position, but keep the direction of the flow in the same circumferential direction. The controller 62 of the control unit 30 may be configured to direct the actuator(s) 60 to rotate some of the drums 26 to one partially open position to direct flow into the plenum 24 while rotating others to another partially open position so that the drums direct flow out of the plenum 24.

Figure 11:
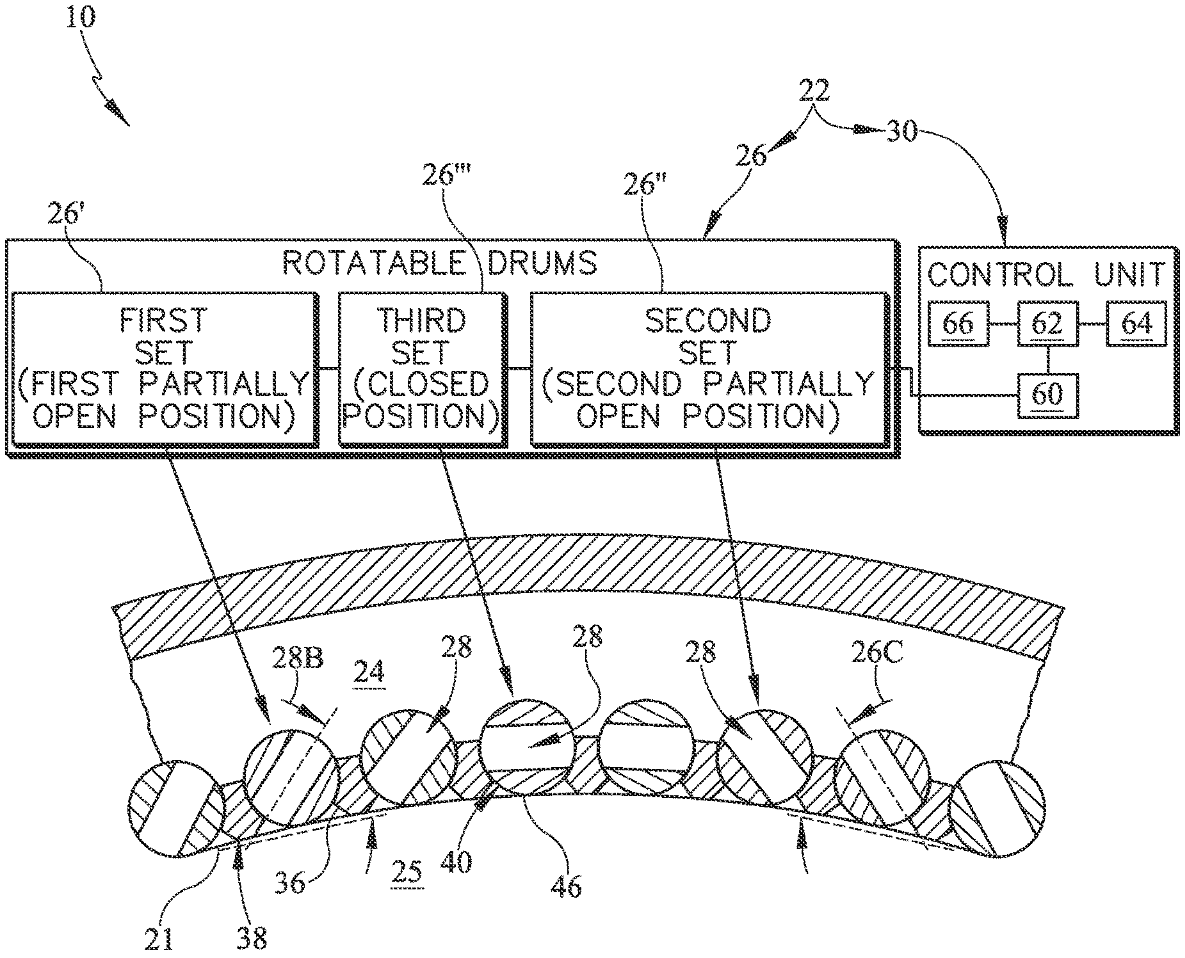
FIG. 11 is an axial cross-section view of the fan case assembly of FIG. 3 showing the plurality of drums may be rotated in different sets, the sets of drums includes a first set of drums, a second set of drums spaced apart circumferentially from the first set of drums, and a third set of drums located circumferentially between the first set and the second set, and further showing the first set of drums are located the first partially open position like as shown in FIG. 9 so that the slots are angled in the first circumferential direction, the second set of drums are located in the second partially open position like as shown in FIG. 10 so that the slots are angled in the second circumferential, and the third set of drums is located in the closed position like as shown in FIG. 7.

As shown in FIG. 11, the controller 62 has directed the actuators 60 to rotate some of the drums 26', or a first set of drums 26', to the first partially opened position, some of the drums 26", or a second set of drums 26", to the second partially opened position, and other drums 26'", or a third set of drums 26'", to the closed position. In the illustrative embodiment, the plurality the second set of drums 26" is spaced apart circumferentially from the first set of drums 26' and the third set of drums 26'" is arranged circumferentially between the two sets of drums 26', 26" as shown in FIG. 11.

In the illustrative embodiment, the first set of drums 26' are arranged in series on one side of the third set of drums 26'", while the second set of drums 26" are arranged in series on the other side of the third set of drums 26'" as shown in FIG. 11. The third set of drums 26'" is kept in the closed position to block flow into the plenum 24, while the first 26' and second set of drums 26'" are positioned to one of the partially open positions or to the fully open position, as show in FIG. 11. The first set of drums 26' allow air to flow into the plenum 24 while the second set of drums 26" direct air to flow out of the plenum 24 as shown in FIG. 11.

In some embodiments, the third set of drums 26"" may be replaced with a portion of the case 20. The first set of drums 26' may be arranged in series on one side of the partition, while the second set of drums 26" are arranged in series on the other side of the partition. The partition would block flow into or out of the plenum 24 between the two sets.

In some embodiments, the control unit 30 may control the plurality of rotatable drums 26 in more than three sets. In some embodiments, the plurality of drums 26 may have more than three sets of drums. In some embodiments, may have less than three sets of drums.

The preselected operating conditions may further include a sensor input from the sensor 66 or sensors 66 included in the control unit 30. The sensor 66 is configured to measure one of pressure, air speed, and acceleration. The sensor 66 is also configured to detect distortion, fan stall, and/or other aeromechanical issues. In some embodiments, the control unit 30 includes a plurality of sensors 66 each configured to measure one of pressure, air speed, and acceleration and/or detect distortion, fan stall, and/or other aeromechanical issues.

The sensor 66 may include one of or a combination of dynamic sensors, static wall pressure sensors, altitude sensors, sensors configured to detect the angle of attack of the plurality of fan blades 14, sensors configured to detect the tip timing of the plurality of fan blades 14, and air speed sensors. In some embodiments, the sensor 66 may be a dynamic pressure transducer. The sensor 66 may also be a sensor configured to measure a rotational speed of the fan blades 14, which could be used along with an additional sensor that is a dynamic pressure transducer. In some embodiments, the sensor 66 may be a sensor configured to measure a rotation speed of another section of the engine 110.

The controller 62 of the control unit 30 is configured to receive a measurement from the sensor 66 or sensors 66 and direct the actuator 60 to rotate some or all of the drums 26 to a corresponding position in response to the measurement of the at least one sensor 66. The controller 62 of the control unit 30 may be configured to direct actuator 60 to rotate some or all of the drums 26 to the closed position when the measurements from the sensor 66 are within a predetermined threshold.

Then, when the measurement from the sensor 66 is outside of the predetermined threshold, the controller 62 directs the actuator 60 to rotate some or all of the drums 26 to one of the partially open positions or the fully open position. Based on the difference of the measurement from the sensor 66 compared to the predetermined threshold, the controller 62 may vary the position of the drums 26 to control the amount of fluid communication between the gas path 25 and the plenum 24 through the slots 28.

In some embodiments, the controller 62 of the control unit 30 may be configured to use a combination of the sensor measurements and the detected preprogrammed aircraft maneuver to control the position of the drums 26. For example, when the controller 62 of the control unit 30 detects a preprogrammed aircraft maneuver and the measurement is outside of the predetermined threshold, the controller 62 directs the actuator 60 to rotate some or all of the drums 26 to one of the partially open positions or to the fully open position.

In some embodiments, the controller 62 of the control unit 30 is configured to use the measurements from the sensor 66 to anticipate the aircraft maneuver. The controller 62 of the control unit 30 is configured to direct the actuator 60 to rotate some or all of the drums 26 to one of the partially open positions or to the fully open position in response to the measurement from the sensor 66 even though no preprogrammed aircraft maneuver is detected.

Alternatively, there may be a delay in the measurements from the sensor 66. Therefore, the controller 62 of the control unit 30 is also configured to direct the actuator 60 to rotate some or all of the drums 26 to one of the partially open positions or to the fully open position when the one of the preprogrammed aircraft maneuvers is detected, even though the measurements from the sensor 66 are within the predetermined thresholds.

In some embodiments, the controller 62 of the control unit 30 may detect one of the preprogrammed aircraft maneuvers, but the measurements from the sensors 66 are within the predetermined threshold. If so, the controller 62 of the control unit 30 may direct some or all of the drums 26 to remain in the current position.

A method of operating the inlet distortion mitigation system 22 may include several steps. During normal cruise conditions, the controller 62 directs the actuator 60 to locate the rotatable drums 26 in the closed position. If the controller 62 detects one of a preselected operating condition other than the cruise condition, the controller 62 directs the actuator 60 to rotate the drums 26 to one of the fully open position or one of the partially open positions depending on the operating condition detected to minimize the negative effects of pressure and swirl distortions to improve stall margin.

The method further includes continually adjusting the position of some or all of the drums 26 based on the preselected operating condition of the engine 110. If the controller 62 detects the cruise condition, the controller 62 directs the actuator 60 to rotate the drums 26 back to the closed position. In other instances, the controller 62 may direct the actuator 60 to control the position of the drums 26 as discussed above based on the preprogrammed aircraft maneuvers and/or the measurements from the sensors.

When dealing with embedded inlet distortion, there may be a steep trade between stall margin and performance of the engine. There may be points during a mission or moments with maneuvers where it may be desirable to incorporate a different available stall margin or to be able to more evenly distribute flows. Attempting to solve the worst stall condition, while maintaining performance over all of the cycle or flight conditions may be difficult and result in compromised efficiency or a limited flight envelope.

Another embodiment of a fan case assembly 210 in accordance with the present disclosure is shown in FIGS. 14 and 15. The fan case assembly 210 is substantially similar to the fan case assembly 10 shown in FIGS. 1-13 and described herein. Accordingly, similar reference numbers in the 200 series indicate features that are common between the fan case assembly 10 and the fan case assembly 210. The description of the fan case assembly 10 is incorporated by reference to apply to the fan case assembly 210, except in instances when it conflicts with the specific description and the drawings of the fan case assembly 210.

The fan case assembly 210 includes, among other components, a case 220 and an inlet distortion mitigation system 222 as shown in FIGS. 14 and 15. The case 220 extends circumferentially at least partway about the axis 11 to define the outer boundary of the gas path 25 of the gas turbine engine 110. The case 220 is formed to define a plenum 224 that extends circumferentially at least partway about the axis 11 and is open to the gas path 25 of the gas turbine engine 110. The inlet distortion mitigation system 222 is configured to control fluid communication between the plenum 224 and the gas path 25 of the gas turbine engine 110.

The inlet distortion mitigation system 222 includes a plurality of rotatable drums 226 and a control unit 230 as shown in FIGS. 14 and 15. The plurality of drums 226 are rotatably coupled to the case 220 in the plenum 224 to rotate about a drum axis A. The plurality of drums 226 are configured to rotate between the closed, partially open, and fully open positions like as shown in FIGS. 7-13. The control unit 230 is configured to move the plurality of drums 226 between the different positions in response to preselected operating conditions to control fluid communication between the plenum 224 and the gas path 25.

The drums 226 and the plenum 224 may extend over an along a portion of the fan blades 14 at the leading edge 16 of the fan blades. The case 220 includes a forward section 232, an aft section 234, and a partition 238 as shown in FIGS. 14 and 15. The aft section 234 is configured to be coupled to the forward section 232 to trap the plurality of drums 226 axially therebetween in the plenum 224. The forward section 232 may include the cavity forming the plenum 224. The forward section 232 and the aft section 234 may meet at a central or mid-span of the fan blades 112.

Each of the drums 226 includes a drum body 240 and a pair of pegs 242, 244 as shown in FIG. 15. The drum body 240 extends between a first axial end 240A and a second axial end 240B spaced apart axially from the first axial end 240A. The drum body 240 defines an outer surface 246 that extends between the first and second axial ends 240A, 240B. The pair of pegs 242, 244 each extend from one of the axial ends 240A, 240B of the drum body 240 to the case 220 to couple the respective drum 226 to the case 220.

The drum body 240 is formed to define the slot 228 as shown in FIG. 15. The slot 228 extends entirely through the drum body 240 axially between the first and second axial ends 240A, 240B of the drum body 240.

In the illustrative embodiment, the plenum 224 and the plurality of drums 226 are located closer to the leading edge 16 of the fan blades 14 as shown in FIGS. 14 and 15. The plenum 224 and the plurality of drums 226 are disposed at or near the leading edge 16 of the fan blades 14 so that the slot 228 is located at or near the leading edge 16 of the fan blades 14.

The drums 226 are rotatable between the closed position, the partially open positions, and the fully open position to change the angle of each slot 228 formed in the drums 226 relative to the gas path 25, thereby controlling fluid communication between the gas path 25 and the plenum 224. The control unit 230 is configured to rotate the drums 226 between the different positions in response to preselected operating conditions. The control unit 230 is configured to control the position of the drums 226 similar to the control unit 30 in FIGS. 1-13.

The preselected operating conditions include a plurality of preprogrammed aircraft maneuvers stored on a memory included in the control unit 330. The plurality of preprogrammed aircraft maneuvers include banks, turns, rolls, etc.

The control unit 230 is configured to detect a preprogrammed aircraft maneuver included in the plurality of preprogrammed aircraft maneuvers. Once the preprogrammed aircraft maneuver is detected, the control unit 230 directs each of the drums 226 to rotate to a corresponding position in response to detecting the preprogrammed aircraft maneuver.

For example, the drums 226 may normally be in the closed position during a cruise condition so that no additional stall margin is created, but performance is not compromised. Then, when the control unit 230 detects a preprogrammed aircraft maneuver, i.e. banks, turns, rolls, the control unit 230 directs the drums 226 to rotate to one of the partially open positions or the fully open position so that flow is permitted into the plenum 224. This permits air pressure and flows to better equalize circumferentially around the fan 112 to improve stall margin of the gas turbine engine 110.

Conversely, when the control unit 230 detects the cruise condition after a preprogrammed aircraft maneuver, the control unit 230 directs the drums 226 to rotate to the closed position. Therefore, once the aircraft maneuver is completed, the drums 226 move to the closed position to performance is not compromised and the additional stall margin is removed during the cruise condition.

The control unit 230 is configured to direct some or all of the drums 226 to rotate from the closed position to one of the partially open positions or the fully open position based on the detected preprogrammed aircraft maneuver. Depending on the preprogrammed aircraft maneuver, the control unit 230 may directly only certain drums 226 to move to one of the partially open positions or the fully open position, while keeping others in the closed position.

Additionally, the control unit 230 may direct some of the drums 226, to remain in the closed position, while directing some of the drums 226 to rotate to the fully opened position and others to a partially open position. The control unit 230 is configured to direct some of the drums 226 to rotate to one partially open position while others are rotated to another partially open position. In other words, the control unit 230 is configured to individual vary the angle of each slot 228 of each of the drums 226.

Similarly, the control unit 230 is configured to receive a measurement from the at least one sensor or sensors and direct the drums 226 to rotate to a corresponding position in response to the measurement like as discussed above with respect to the embodiment of FIGS. 1-3. In some embodiments, the control unit 230 may be configured to use a combination of the sensor measurements and the detected preprogrammed aircraft maneuver to control the position of the plurality of drums 226.

Another embodiment of a fan case assembly 310 in accordance with the present disclosure is shown in FIGS. 16 and 17. The fan case assembly 310 is substantially similar to the fan case assembly 10 shown in FIGS. 1-13 and described herein. Accordingly, similar reference numbers in the 300 series indicate features that are common between the fan case assembly 10 and the fan case assembly 310. The description of the fan case assembly 10 is incorporated by reference to apply to the fan case assembly 310, except in instances when it conflicts with the specific description and the drawings of the fan case assembly 310.

The fan case assembly 310 includes, among other components, a case 320 and an inlet distortion mitigation system 322 as shown in FIGS. 16 and 17. The case 320 extends circumferentially at least partway about the axis 11 to define the outer boundary of the gas path 25 of the gas turbine engine 110. The case 320 is formed to define a plenum 324 that extends circumferentially at least partway about the axis 11 and is open to the gas path 25 of the gas turbine engine 110. The inlet distortion mitigation system 322 is configured to control fluid communication between the plenum 324 and the gas path 25 of the gas turbine engine 110.

The inlet distortion mitigation system 322 includes a plurality of rotatable drums 326 and a control unit 330 as shown in FIGS. 16 and 17. The plurality of drums 226 are rotatably coupled to the case 320 in the plenum 324 to rotate about a drum axis A. The plurality of drums 326 are configured to rotate between the closed, partially open, and fully open positions like as shown in FIGS. 7-13. The control unit 330 is configured to move the plurality of drums 326 between the different positions in response to preselected operating conditions to control fluid communication between the plenum 324 and the gas path 25.

The drums 326 and the plenum 324 may extend over an along a portion of the fan blades 14 at the trailing edge 18 of the fan blades. The case 320 includes a forward section 332, an aft section 334, and a partition 336 as shown in FIGS. 16 and 17. The aft section 334 is configured to be coupled to the forward section 332 to trap the plurality of drums 326 axially therebetween in the plenum 224. The aft section 334 may include the cavity forming the plenum 224. The forward section 232 and the aft section 334 may meet at a central or mid-span of the fan blades 112.

Each of the drums 326 includes a drum body 340 and a pair of pegs 342, 344 as shown in FIG. 17. The drum body 340 extends between a first axial end 340A and a second axial end 340B spaced apart axially from the first axial end 340A. The drum body 340 defines an outer surface 346 that extends between the first and second axial ends 340A, 340B. The pair of pegs 342, 344 each extend from one of the axial ends 340A, 340B of the drum body 340 to the case 320 to couple the respective drum 326 to the case 320.

The drum body 340 is formed to define the slot 328 as shown in FIG. 17. The slot 328 extends entirely through the drum body 340 axially between the first and second axial ends 340A, 340B of the drum body 340.

In the illustrative embodiment, the plenum 324 and the plurality of drums 326 are located closer to the trailing edge 18 of the fan blades 14 as shown in FIGS. 16 and 17. The plenum 324 and the plurality of drums 326 are disposed at or near the trailing edge 18 of the fan blades 14 so that the slot 328 is located at or near the trailing edge 18 of the fan blades 14.

The drums 326 are rotatable between the closed position, the partially open positions, and the fully open position to change the angle of each slot 328 formed in the drums 326 relative to the gas path 25, thereby controlling fluid communication between the gas path 25 and the plenum 324. The control unit 330 is configured to rotate the drums 326 between the different positions in response to preselected operating conditions. The control unit 330 is configured to control the position of the drums 326 similar to the control unit 30 in FIGS. 1-13.

The preselected operating conditions include a plurality of preprogrammed aircraft maneuvers stored on a memory included in the control unit 330. The plurality of preprogrammed aircraft maneuvers include banks, turns, rolls, etc.

The control unit 330 is configured to detect a preprogrammed aircraft maneuver included in the plurality of preprogrammed aircraft maneuvers. Once the preprogrammed aircraft maneuver is detected, the control unit 330 directs each of the drums 326 to rotate to a corresponding position in response to detecting the preprogrammed aircraft maneuver.

For example, both the drums 326 may normally be in the closed position during a cruise condition so that no additional stall margin is created, but performance is not compromised. Then, when the control unit 330 detects a preprogrammed aircraft maneuver, i.e. banks, turns, rolls, the control unit 330 directs the drums 326 to rotate to one of the partially open positions or the fully open position so that flow is permitted into the plenum 324. This permits air pressure and flows to better equalize circumferentially around the fan 112 to improve stall margin of the gas turbine engine 110.

Conversely, when the control unit 330 detects the cruise condition after a preprogrammed aircraft maneuver, the control unit 330 directs the drums 326 to rotate to the closed position. Therefore, once the aircraft maneuver is completed, the drums 326 move to the closed position to performance is not compromised and the additional stall margin is removed during the cruise condition.

The control unit 330 is configured to direct some or all of the drums 326 to rotate from the closed position to one of the partially open positions or the fully open position based on the detected preprogrammed aircraft maneuver. Depending on the preprogrammed aircraft maneuver, the control unit 330 may directly only certain drums 326 to move to one of the partially open positions or the fully open position, while keeping others in the closed position.

Additionally, the control unit 330 may direct some of the drums 326, to remain in the closed position, while directing some of the drums 326 to rotate to the fully opened position and others to a partially open position. The control unit 330 is configured to direct some of the drums 326 to rotate to one partially open position while others are rotated to another partially open position. In other words, the control unit 230 is configured to individual vary the angle of each slot 328 of each of the drums 326.

Similarly, the control unit 330 is configured to receive a measurement from the at least one sensor or sensors and direct the drums 326 to rotate to a corresponding position in response to the measurement like as discussed above with respect to the embodiment of FIGS. 1-3. In some embodiments, the control unit 330 may be configured to use a combination of the sensor measurements and the detected preprogrammed aircraft maneuver to control the position of the plurality of drums 326.

Figure 18A:
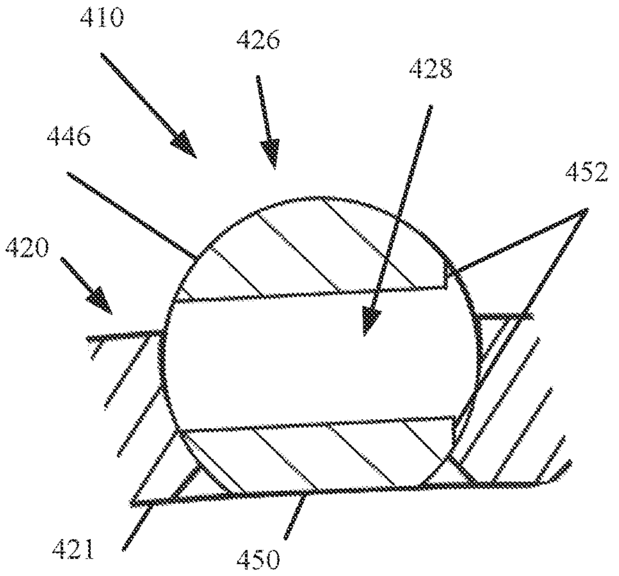
FIG. 18A is a circumferential cross-section view of another embodiment of a fan case assembly included in the gas turbine engine of FIG. 1 showing the fan case assembly includes a fan case and a substantially cylindrical drum with flattened sides that is configured to rotate relative to the fan case, and further showing that a first flattened surface of drum is aligned with an inner surface of the fan case when the drum is in a closed position so that a portion of the drum is flush with the inner surface of the fan case.
Figure 18B:
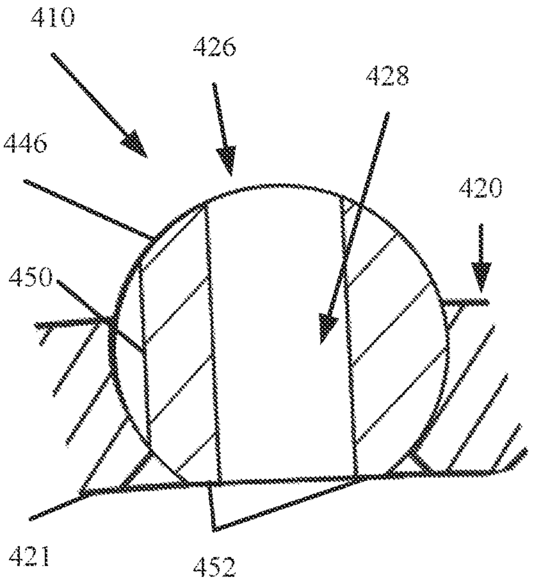
FIG. 18B is a circumferential cross-section view similar to FIG. 18A showing the drum has rotated to a fully open position so that a second flattened surface of the drum is aligned with the inner surface of the fan case when in the drum is in the fully open position.

Another embodiment of a fan case assembly 410 in accordance with the present disclosure is shown in FIGS. 18A and 18B. The fan case assembly 410 is substantially similar to the fan case assemblies 10, 210, 310 shown in FIGS. 1-17 and described herein. Accordingly, similar reference numbers in the 400 series indicate features that are common between the fan case assembly 10, 210, 310 and the fan case assembly 410. The description of the fan case assembly 10, 210, 310 is incorporated by reference to apply to the fan case assembly 410, except in instances when it conflicts with the specific description and the drawings of the fan case assembly 410.

The fan case assembly 410 includes, among other components, a case 420 and an inlet distortion mitigation system having a plurality of rotatable drums. One of the rotatable drums 426 is shown in FIGS. 18A and 18B.

The rotatable drum 426 has a substantially cylindrical shape as shown in FIGS. 18A and 18B. The drum 426 has an outer surface 446 with flattened surface sections 450, 452 as shown in FIGS. 18A and 18B. The flattened surfaces 450, 452 are configured to align with an inner surface 421 of the fan case 420 when the drum 426 is in the closed position as shown in FIG. 18A and the fully open position as shown in FIG. 18B. The first flattened surface 450 of the drum 426 is aligned with the inner surface 421 of the fan case 420 when the drum 426 is in the closed position. The second flattened surface 452 of the drum 426 is aligned with the inner surface 421 of the fan case 420 when the drum 426 is in the fully open position. In this way, the drum 426 is flush with the inner surface 421 of the fan case 420 at the different positions.

Figure 19A:
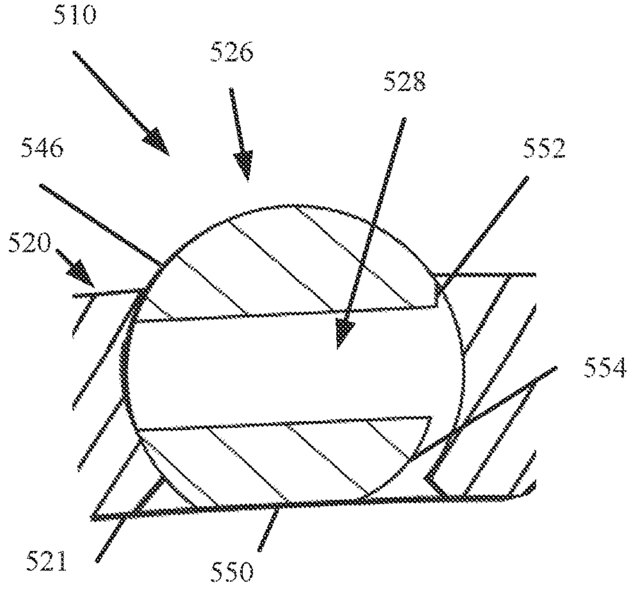
FIG. 19A is a circumferential cross-section view of another embodiment of a fan case assembly included in the gas turbine engine of FIG. 1 showing the fan case assembly includes a fan case and a substantially cylindrical drum with partially rounded and flattened sides that is configured to rotate relative to the fan case, and further showing that a first flattened surface of the drum is aligned with an inner surface of the fan case when the drum is in a closed position so that a portion of the drum is flush with the inner surface of the fan case.
Figure 19B:
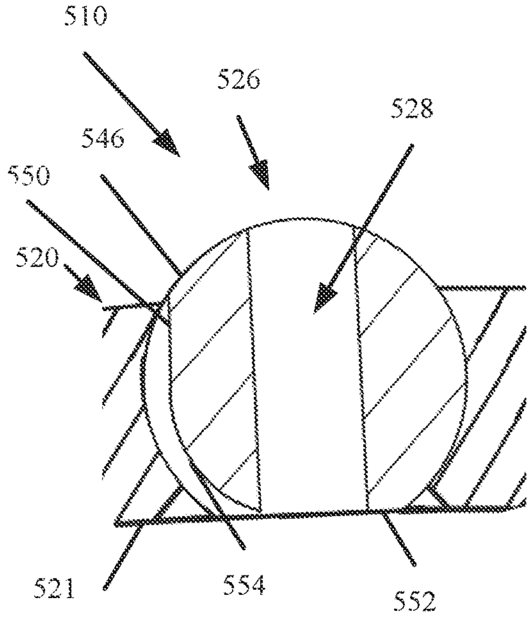
FIG. 19B is a circumferential cross-section view similar to FIG. 19A showing the drum has rotated to a fully open position so that a second flattened surface of the drum is aligned with the inner surface of the fan case when in the drum is in the fully open position.

Another embodiment of a fan case assembly 510 in accordance with the present disclosure is shown in FIGS. 19A and 19B. The fan case assembly 510 is substantially similar to the fan case assemblies 10, 210, 310 shown in FIGS. 1-17 and described herein. Accordingly, similar reference numbers in the 500 series indicate features that are common between the fan case assembly 10, 210, 310 and the fan case assembly 510. The description of the fan case assembly 10, 210, 310 is incorporated by reference to apply to the fan case assembly 510, except in instances when it conflicts with the specific description and the drawings of the fan case assembly 510.

The fan case assembly 510 includes, among other components, a case 520 and an inlet distortion mitigation system having a plurality of rotatable drums. One of the rotatable drums 526 is shown in FIGS. 19A and 19B.

The rotatable drum 526 has a substantially cylindrical shape as shown in FIGS. 19A and 19B. The drum 526 has an outer surface 546 with flattened surface sections 550, 552 and a rounded or shaved section 554 as shown in FIGS. 19A and 19B. The flattened surfaces 550, 552 are configured to align with an inner surface 521 of the fan case 520 when the drum 526 is in the closed position as shown in FIG. 19A and the fully open position as shown in FIG. 19B. The rounded or shaved surface 554 prevents the drum 526 from protruding past the fan case 521 and into the flow path when the drum 526 rotates between the different positions.

The first flattened surface 550 of the drum 526 is aligned with the inner surface 521 of the fan case 520 when the drum 526 is in the closed position. The second flattened surface 550 of the drum 526 is aligned with the inner surface 521 of the fan case 520 when the drum 526 is in the fully open position. In this way, the drum 526 is flush with the inner surface 521 of the fan case 520 at the different positions.

The fan 112 includes an inlet distortion mitigation system 22, 222, 322 which includes a plurality of rotatable drums 26, 226, 326 configured to control fluid communication between the plenum 24, 224, 324 and the gas path 25. The plurality of rotatable drums 26, 226, 326 may be rotated all together or in sets/groups to expose the tips of the fan blades 14 to the plenum 24, 224, 324 radially outward of the drums 26, 226, 326.

The flow path or gas path 25 between the drums 26, 226, 326 is a static flow path or has partitions 38 so when the slots 28, 228, 328 are rotated away from the gas path 25, the gas path 25 is relatively smooth. Then the drums 26, 226, 326 may be rotated to expose the slots 28, 228, 328 to the gas path 25 and direct flow into the plenum 24, 224, 324.

In the illustrative embodiment, the partitions 38 may block part of the slot 28 in certain positions to vary the size of the opening to the slot 28 thereby modulating the flow therethrough. In some embodiments, the partitions 38 do not block the opening to the slot 28 such that in the fully open and partially open positions the slots 28 are completely open to the gas path 25.

The rotating drums 26, 226, 326 may be incorporated into the fan case 20, 220, 320 or into liners and operated via a variable geometry system similar to variable vanes. The actuator(s) 60 may be similar to the variable geometry system used with variable vanes.

In the first condition, or the closed position, any opening to the plenum 24, 224, 324 would be closed so no additional stall margin is created, but performance is not compromised. In a second condition, or the fully open position or partially open positions, the plurality of drums 26, 226, 326 rotates to permit flows into the plenum 24, 224, 324. This permits air pressure and flows to better equalize circumferentially and provides additional stall margin benefit. The angle of the slots 28, 228, 328 of the drums 26, 226, 326 may be adjusted to tune the arrangement to particular needs or conditions.

The plurality of drums 26, 226, 326 permit the fan 112 to optimize efficiency at a cruise point with limited distortion, while being able to maintain adequate stall margin at another condition. By activating the rotatable drums 26, 226, 326 to trade efficiency for stall margin improvement, but not have to live with that trade at all times, the inlet distortion mitigation system 22, 222, 322 allows optimization of the fan 112.

The plenum 24, 224, 324 uses rotating of the drums 26, 226, 326 to open or close the passage of air to the plenum 24, 224, 324. The slots 28, 228, 328 of the drums 26, 226, 326 may be rotated to a range of angles between 0 to about 90 degrees.

This may be done with all drums 26, 226, 326 controlled the same, or with different angles for different sectors via ganging. The channel or plenum 24, 224, 324 itself may have different cross-sections when viewed in the circumferential direction. In some embodiments, the cross-section of the plenum 24, 224, 324 is a forward-leaning cross-sectional shape outboard of the space for the drums 26, 226, 326. In some embodiments, the cross-section of the plenum 24, 224, 324 may have different shape. In the illustrative embodiment, the cross-section of the plenum 24, 224, 324 is rectangular when viewed circumferentially about the axis 11.

In some embodiments, the drums 26, 226, 326 may be ganged by sectors and have some drums 26, 226, 326 at different circumferential locations be open to flow into the plenum 24, 224, 324 and other drums 26, 226, 326 to help flow out of the plenum. Other drums 26, 226, 326 in the middle may be closed. While all drums 26, 226, 326 may be in one direction as in FIGS. 7-10, the air would have to flow past the drums 26, 226, 326 and then between it and a neighboring to flow out.

The drums 26, 226, 326 may be any suitable shape capable of controlling a flow or air between the gas path 25 and the plenum 24, 224, 324 when rotated or actuated. In the illustrative embodiments, the drums 26, 226, 326 are cylindrical. In some embodiments, the drums 26, 226, 326 may have a substantially cylindrical shape like drums 426, 526 as shown in FIGS. 18-19A.

In some embodiments, as shown in FIGS. 18A and 18B, the drums 426, and/or the surface 446 of the drum 426 may have one or more flattened surfaces or portions 450, 452. The flattened portions 450, 452 may allow for the drums 426 to be aligned with the inner surface 421 of the fan case when the drum 426 is in the closed position or fully open position, so that the outer surface 446 of the drum 426 sits flush with the fan case 421 and does not protrude into the flow path.

In some embodiments, as shown in FIGS. 19A and 19B, the drums 526, and/or the outer surface 546 of the drum 526 may have one or more rounded or shaved portions 554 and/or one or more flattened portions 550, 552. The flattened portions 550, 552 may be aligned with the inner surface 521 of the fan case when the drum 526 is in the closed position or fully open position, so that the outer surface 546 of the drums 526 sits flush with the fan case 521 and does not protrude into the flow path. The rounded or shaved portions 554 may be between the flattened portions 550, 552, and may prevent the drums 526, from protruding past the fan case 521 and into the flow path. In some embodiments, the slot 528 may be open to flowpath 25, but air may not be able to flow into the plenum, as shown in FIG. 19A.

The control unit 30 is configured to use sensor inputs from a sensor 66 to control operation of the drums 26, 226, 326. The sensor 66 may include one of or a combination of a static wall pressure sensor, an altitude sensor, sensors configured to detect twisting of the fan blades 14, sensors configured to detect the tip timing of the fan blades 14, sensors configured to measure a rotational speed of the fan blades 14, a dynamic pressure transducer sensor. The combination of some sensors may provide data to engage mitigation of the effects of distortion, while other sensors may detect the maneuvers or mission phase.

For example, altitude and fan speed may provide data to engage mitigation, while also providing maneuver detection or regime/mission phase framing of control logic. Additionally, static wall pressure, dynamic pressure transducers, blade tip timing, blade untwist as well as fan speed and altitude may be used in distortion/effect detection for the control logic.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case assembly adapted for use with a gas turbine engine, the fan case assembly comprising a case that extends circumferentially at least partway about a central axis of the fan case assembly to define an outer boundary of a gas path of the gas turbine engine, the case formed to define a plenum that extends circumferentially at least partway about the central axis, a plurality of drums arranged in the plenum and spaced circumferentially about the central axis, each drum of the plurality of drums shaped to include a slot that extends through the corresponding drum, each drum of the plurality of drums configured to rotate about a respective drum axis between a closed position in which the slot of the corresponding drum extends circumferentially relative to the central axis to close off the slot from the gas path to block fluid communication between the gas path and the plenum through the slot and a fully open position in which the slot of the corresponding drum extends radially relative to the central axis to open the slot to the gas path to allow fluid communication between the gas path and the plenum through the slot, and a control unit configured to rotate the plurality of drums about the respective drum axis between the closed position and the fully open position in response to preselected operating conditions to minimize negative effects pressure and swirl distortions in the gas turbine engine to improve stall margin.

2. The fan case assembly of claim 1, wherein the plurality of drums are each configured to rotate relative to the case to a plurality of partially opened positions between the closed position and the fully open position in which the slot of the corresponding drum extends at an intermediate angle relative to the gas path.

3. The fan case assembly of claim 2, wherein the plurality of partially opened positions includes a first partially opened position in which the slot of the corresponding drum is angled in a first circumferential direction about the central axis and a second partially opened position in which the slot of the corresponding drum is angled in a second circumferential direction about the central axis, wherein the second circumferential direction is opposite to the first circumferential direction.

4. The fan case assembly of claim 1, wherein the plurality of drums includes a first set of drums and a second set of drums and the control unit is configured to rotate the first set of drums between the closed position and the fully open position independent of the second set of drums.

5. The fan case assembly of claim 4, wherein the first set of drums are arranged in series and the second set of drums are arranged in series spaced apart circumferentially from the first set of drums.

6. The fan case assembly of claim 4, wherein the first set of drums are alternated circumferentially between the second set of drums.

7. The fan case assembly of claim 1, wherein each drum of the plurality of drums has a cylindrical shape that defines a first end, a second end spaced apart axially from the first end, and an outer surface that extends axially between the first end and the second end and circumferentially about the corresponding drum axis, and wherein the outer surface of each drum of the plurality of drums cooperates with an inner surface of the gas path to define a portion of the outer boundary of the gas path when each drum of the plurality of drums is in the closed position to block fluid communication between the gas path and the plenum.

8. The fan case assembly of claim 1, wherein the control unit includes at least one actuator coupled to the plurality of drums and configured to drive rotation of the plurality of drums between the closed position and the fully open position and a controller coupled to the at least one actuator and configured to direct the at least one actuator to move the plurality of drums to the closed position when the gas turbine engine is in a cruise condition included in the preselected operating conditions.

9. The fan case assembly of claim 8, wherein the control unit further includes a memory coupled to the controller, the memory including a plurality of preprogrammed aircraft maneuvers that each correspond to one of the closed position and the fully open position, and wherein the controller is configured to detect a preprogrammed aircraft maneuver included in the plurality of preprogrammed aircraft maneuvers on the memory and direct the at least one actuator to move the plurality of drums to a corresponding position in response to detecting the preprogrammed aircraft maneuver.

10. The fan case assembly of claim 8, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the plurality of drums to a corresponding position in response to the measurement of the at least one sensor.

11. A gas turbine engine comprising a fan including a fan rotor configured to rotate about an axis of the gas turbine engine and a plurality of fan blades coupled to the fan rotor for rotation therewith and a fan case assembly adapted for use with the gas turbine engine, the fan case assembly comprising a case that extends circumferentially at least partway about a central axis of the fan case assembly to define an outer boundary of a gas path of the gas turbine engine, the case formed to define a plenum that extends circumferentially at least partway about the central axis, a plurality of drums arranged in the plenum, each drum of the plurality of drums shaped to include a slot that extends through the corresponding drum, each drum of the plurality of drums configured to rotate about a respective drum axis between a closed position in which the slot of the corresponding drum extends circumferentially relative to the central axis to block fluid communication between the gas path and the plenum through the slot and a fully open position in which the slot of the corresponding drum extends radially relative to the central axis to allow fluid communication between the gas path and the plenum through the slot, and a control unit configured to rotate the plurality of drums about the respective drum axis between the closed position and the fully open position in response to preselected operating conditions to minimize negative effects pressure and swirl distortions in the gas turbine engine to improve stall margin.

12. The gas turbine engine of claim 11, wherein the plurality of drums are each configured to rotate relative to the case to a plurality of partially open positions between the closed position and the fully open position in which the slot of the corresponding drum extends at an intermediate angle relative to the gas path.

13. The fan case assembly of claim 12, wherein the plurality of partially opened positions includes a first partially opened position in which the slot of the corresponding drum is angled in a first circumferential direction about the central axis and a second partially opened position in which the slot of the corresponding drum is angled in a second circumferential direction about the central axis, wherein the second circumferential direction is opposite to the first circumferential direction.

14. The fan case assembly of claim 11, where each of the plurality of fan blades includes a leading edge and a trailing edge, and wherein the plenum and the plurality of drums are located closer to one of the leading edge and the trailing edge of the plurality of fan blades.

15. The fan case assembly of claim 11, wherein each drum of the plurality of drums has a cylindrical shape that defines a first end, a second end spaced apart axially from the first end, and an outer surface that extends axially between the first end and the second end and circumferentially about the corresponding drum axis, and wherein the outer surface of each drum of the plurality of drums cooperates with an inner surface of the gas path to define a portion of the outer boundary of the gas path when each drum of the plurality of drums is in the closed position to block fluid communication between the gas path and the plenum.

16. The gas turbine engine of claim 15, wherein the first set of drums are arranged in series and the second set of drums are arranged in series spaced apart circumferentially from the first set of drums.

17. The gas turbine engine of claim 15, wherein the first set of drums are alternated circumferentially between the second set of drums.

18. The gas turbine engine of claim 11, wherein the control unit includes at least one actuator coupled to the plurality of drums and configured to drive movement of the plurality of drums between the closed position and the fully open position and a controller coupled to the at least one actuator and configured to direct the at least one actuator to move the plurality of drums to the closed position when the gas turbine engine is in a cruise condition included in the preselected operating conditions.

19. The gas turbine engine of claim 18, wherein the control unit further includes a memory coupled to the controller, the memory including a plurality of preprogrammed aircraft maneuvers that each correspond to one of the closed position and the fully open position, and wherein the controller is configured to detect a preprogrammed aircraft maneuver included in the plurality of preprogrammed aircraft maneuvers on the memory and direct the at least one actuator to move the plurality of drums to a corresponding position in response to detecting the preprogrammed aircraft maneuver.

20. A method comprising providing a fan case assembly adapted for use with a gas turbine engine, the fan case assembly including a case that extends circumferentially at least partway about a central axis of the gas turbine engine and formed to define an outer boundary of a gas path of the gas turbine engine, the case formed to define a plenum that extends circumferentially at least partway about the central axis, and a plurality of drums arranged in the plenum, each drum of the plurality of drums shaped to include a slot that extends through the corresponding drum, each drum of the plurality of drums configured to rotate about a respective drum axis, locating the plurality of drums in a closed position in which the slot of the corresponding drum extends circumferentially relative to the central axis to block fluid communication between the gas path and the plenum through the slot, and rotating the plurality of drums to a fully open position in which the slot of the corresponding drum extends radially relative to the central axis to allow fluid communication between the gas path and the plenum through the slot.

* * * * *